US008468650B2

(12) United States Patent
Talpe

(10) Patent No.: US 8,468,650 B2
(45) Date of Patent: Jun. 25, 2013

(54) DOOR CLOSING MECHANISM

(76) Inventor: Joseph Talpe, Heestert-Zwevegem (BE)

(*) Notice: Subject to any disclaimer, the term of this patent is extended or adjusted under 35 U.S.C. 154(b) by 0 days.

(21) Appl. No.: 13/128,691

(22) PCT Filed: Aug. 27, 2009

(86) PCT No.: PCT/EP2009/061087
§ 371 (c)(1),
(2), (4) Date: May 11, 2011

(87) PCT Pub. No.: WO2010/054869
PCT Pub. Date: May 20, 2010

(65) Prior Publication Data
US 2011/0214253 A1 Sep. 8, 2011

(30) Foreign Application Priority Data

Nov. 14, 2008 (EP) .................................. 08169208
Nov. 14, 2008 (EP) .................................. 08169211

(51) Int. Cl.
*E05F 3/22* (2006.01)
(52) U.S. Cl.
USPC ...................................... 16/58; 16/68; 16/54
(58) Field of Classification Search
USPC .................. 16/50, 54, 68, 58, 71, 78, 80, 49, 16/51, 318, 319, 280, 281, 310, 316, 317
See application file for complete search history.

(56) References Cited

U.S. PATENT DOCUMENTS

| 1,952,902 | A |   | 3/1934  | Barros |               |
|-----------|---|---|---------|-----------------|---------|
| 2,164,358 | A | * | 7/1939  | Stannard        | 16/54   |
| 4,100,646 | A | * | 7/1978  | Schubeis        | 16/54   |
| 4,391,020 | A | * | 7/1983  | Hsu             | 16/314  |
| 4,413,373 | A | * | 11/1983 | Sasaki          | 16/54   |
| 4,825,503 | A | * | 5/1989  | Shiramasa et al.| 16/52   |
| 4,829,628 | A | * | 5/1989  | Vuksic          | 16/54   |
| 4,995,194 | A | * | 2/1991  | Schultze et al. | 49/32   |
| 5,414,894 | A | * | 5/1995  | Fayngersh       | 16/52   |
| 5,419,013 | A | * | 5/1995  | Hsiao           | 16/319  |
| 6,205,619 | B1| * | 3/2001  | Jang            | 16/352  |
| 6,854,161 | B2| * | 2/2005  | Lee             | 16/50   |
| 2004/0068833 | A1 | * | 4/2004 | Sawa           | 16/60   |
| 2010/0263289 | A1 | * | 10/2010| Sawa           | 49/386  |

FOREIGN PATENT DOCUMENTS

| AT | 393004 B        | 7/1991  |
| DE | 516627 C        | 1/1931  |
| DE | 102005055558 A1 | 5/2007  |
| GB | 1602914 A       | 11/1981 |

* cited by examiner

*Primary Examiner* — Chuck Y. Mah
(74) *Attorney, Agent, or Firm* — Sughrue Mion, PLLC

(57) ABSTRACT

A door closing mechanism which includes a hydraulic rotation damper, having a closed cylinder cavity within a cylinder barrel, a rotational damper shaft which extends into the cylinder cavity, a piston dividing the cylinder cavity into a first side above the piston and a second side below the piston, a one-way valve allowing fluid flow from said first side to said second side of the cylinder cavity, and a fluid passage between said first and second sides of the cylinder cavity, with a flow restrictor, in particular in the form of a needle valve, adjustable through an orifice in the cylinder barrel, wherein said second side of the cylinder cavity and said orifice are at opposite sides of the flow restrictor.

14 Claims, 20 Drawing Sheets

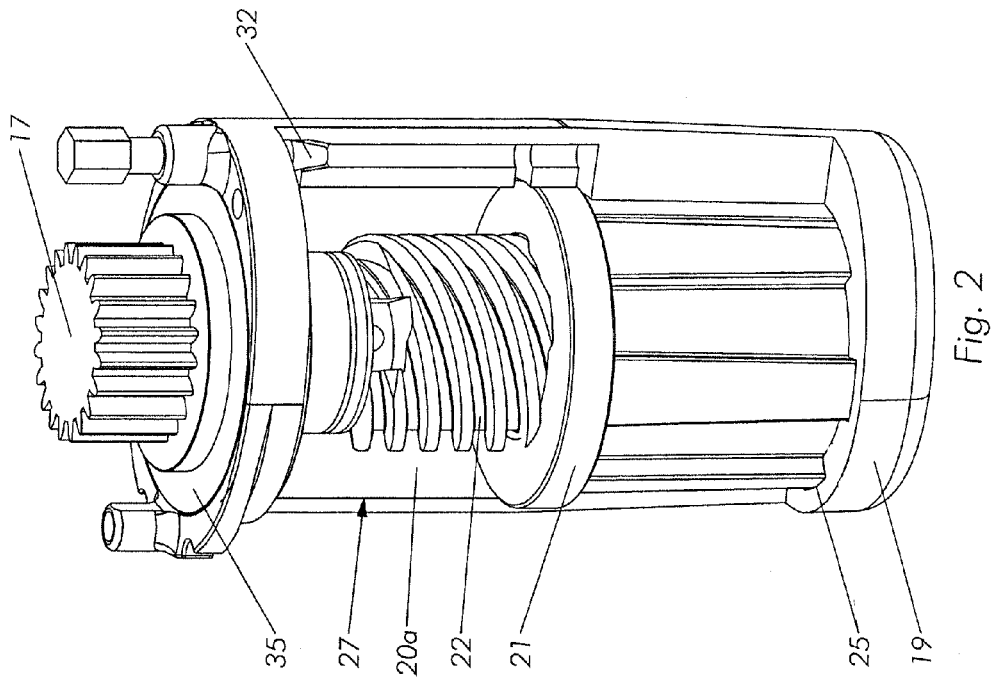
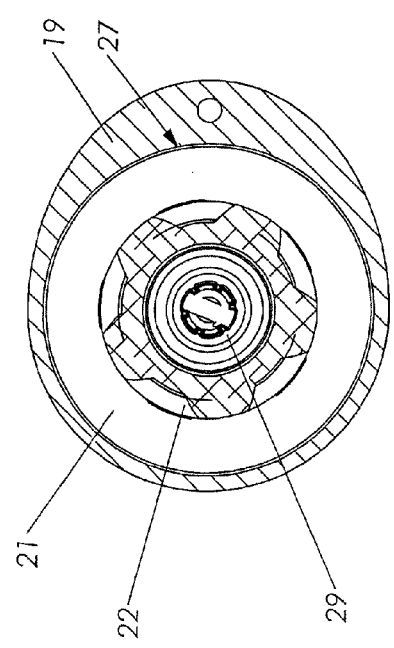
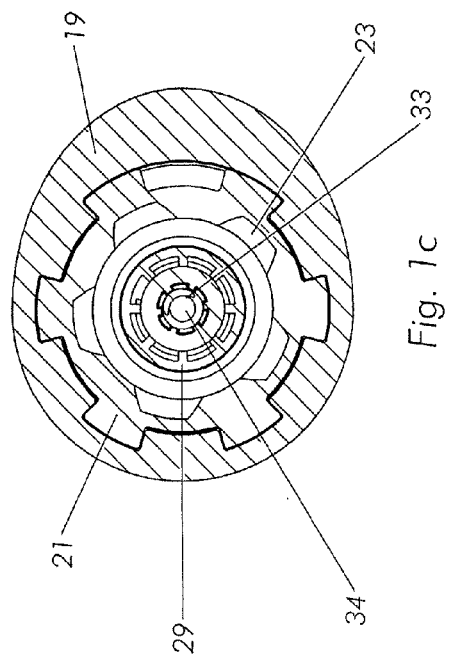

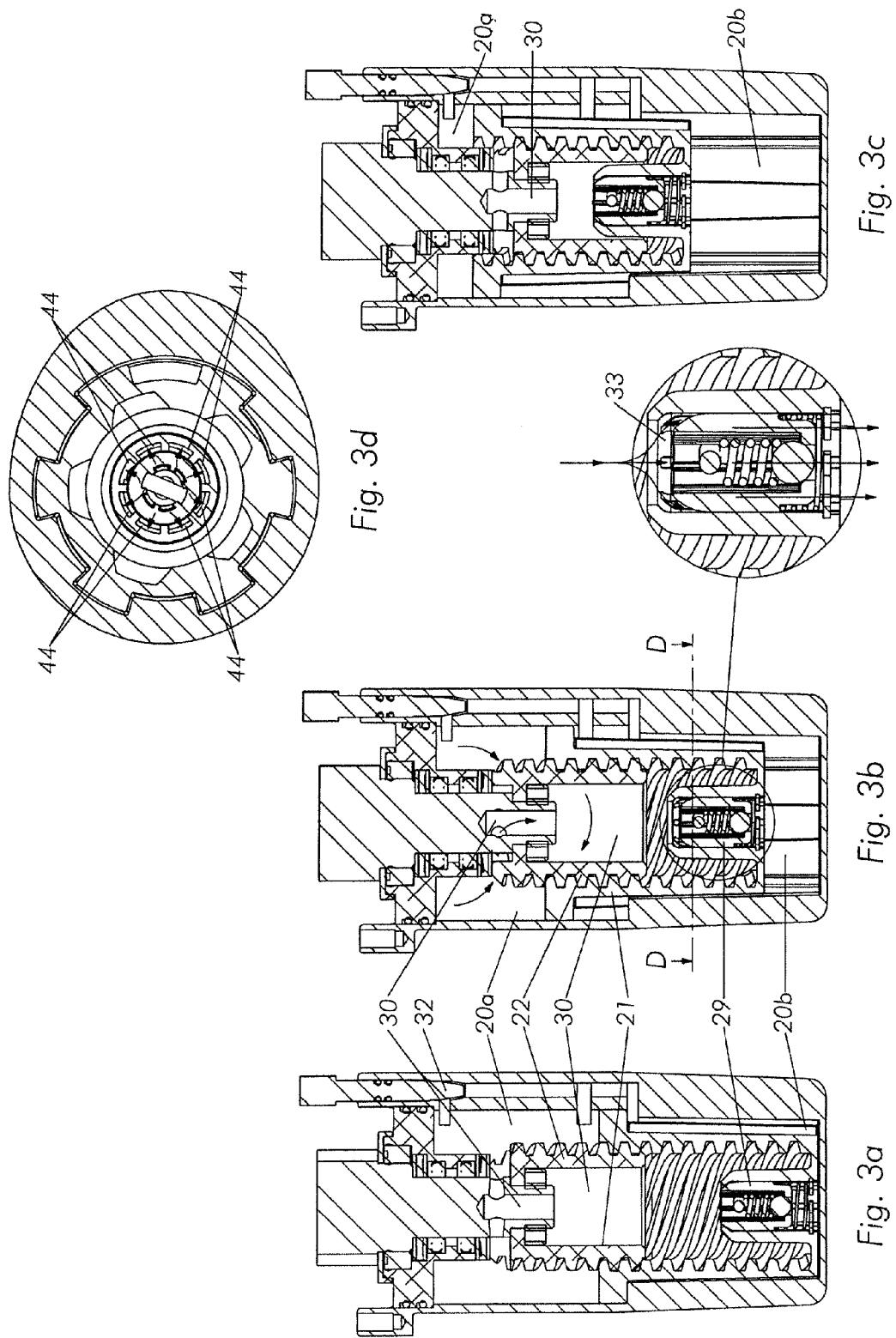

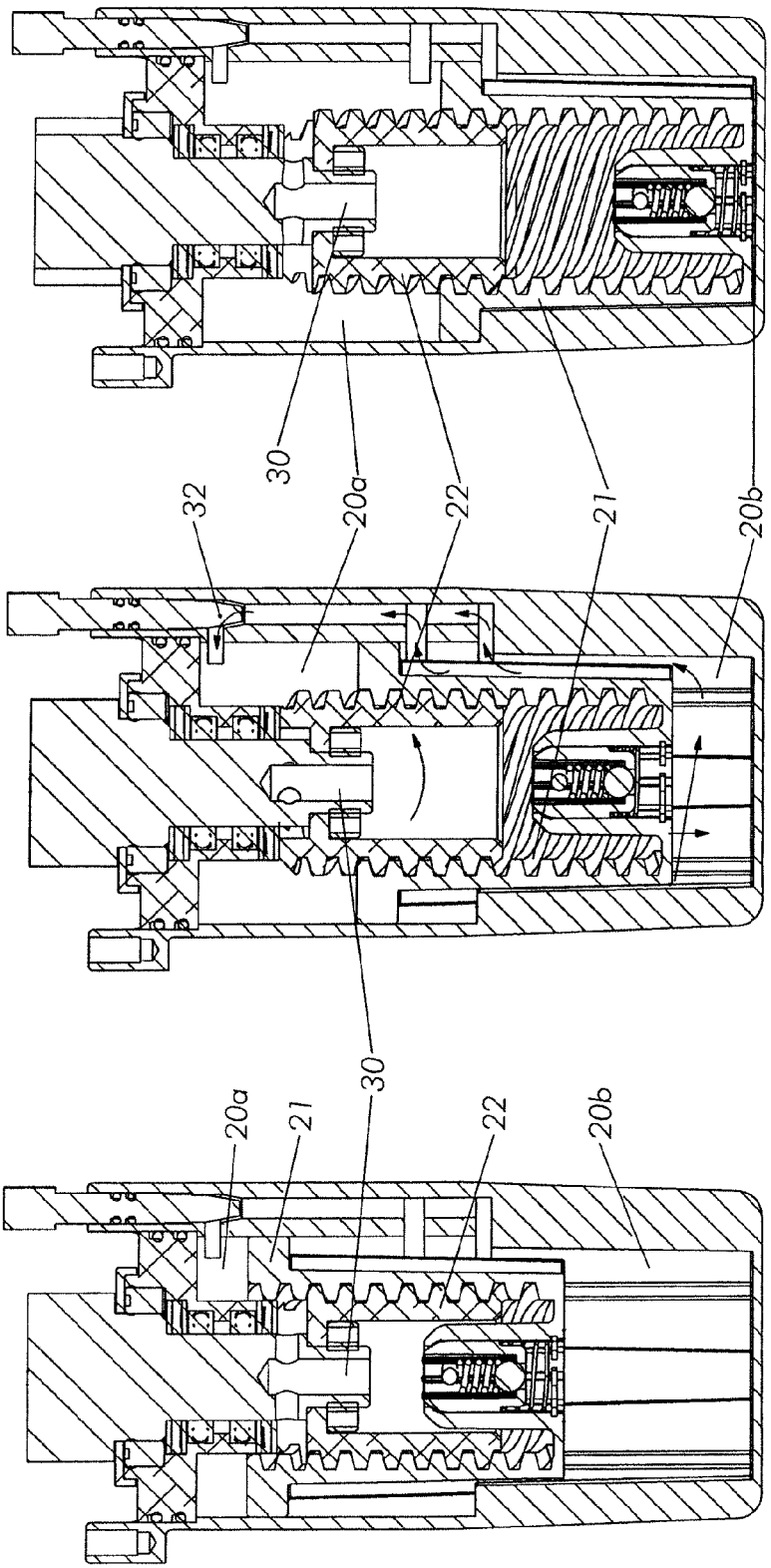

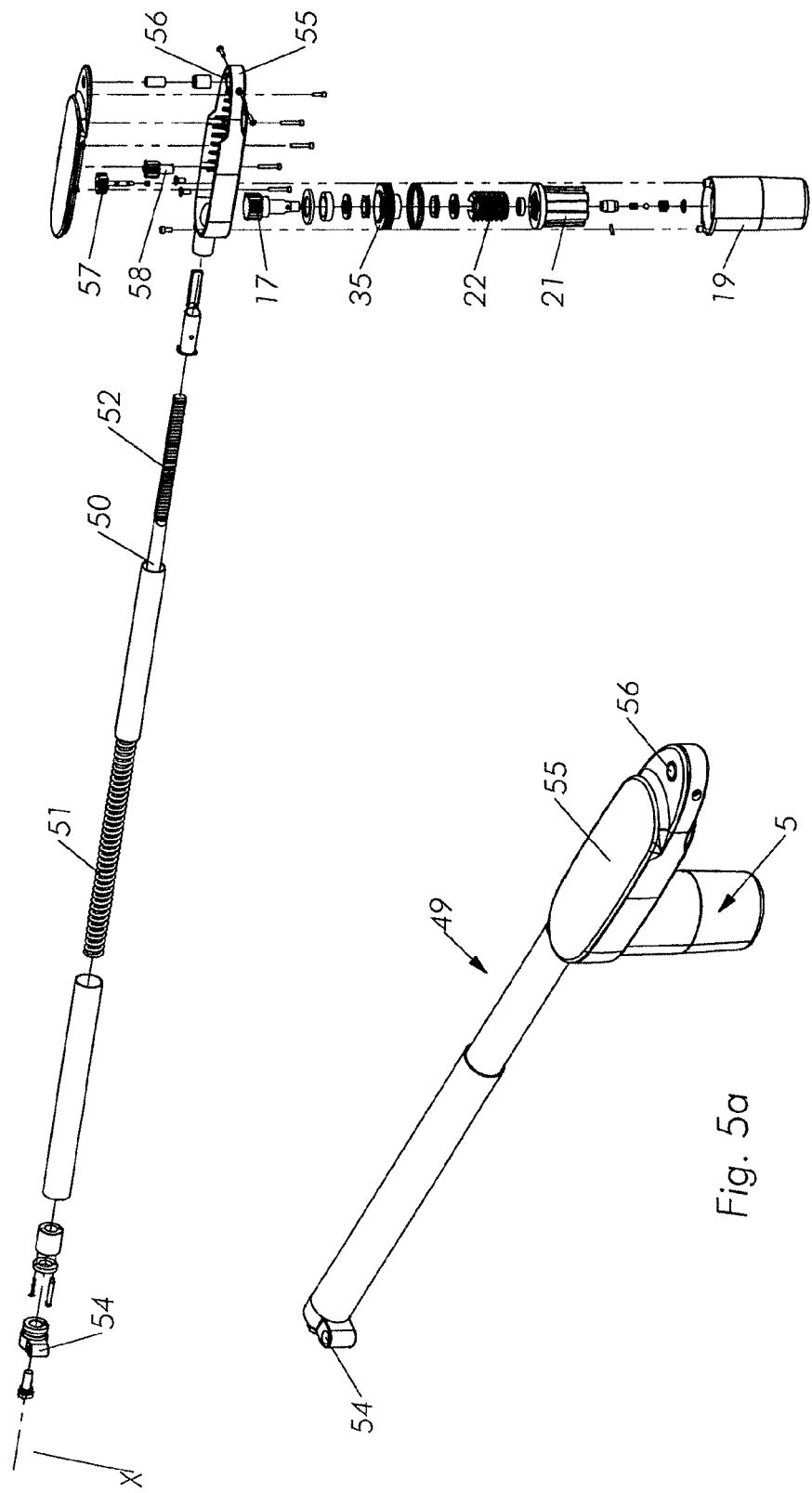

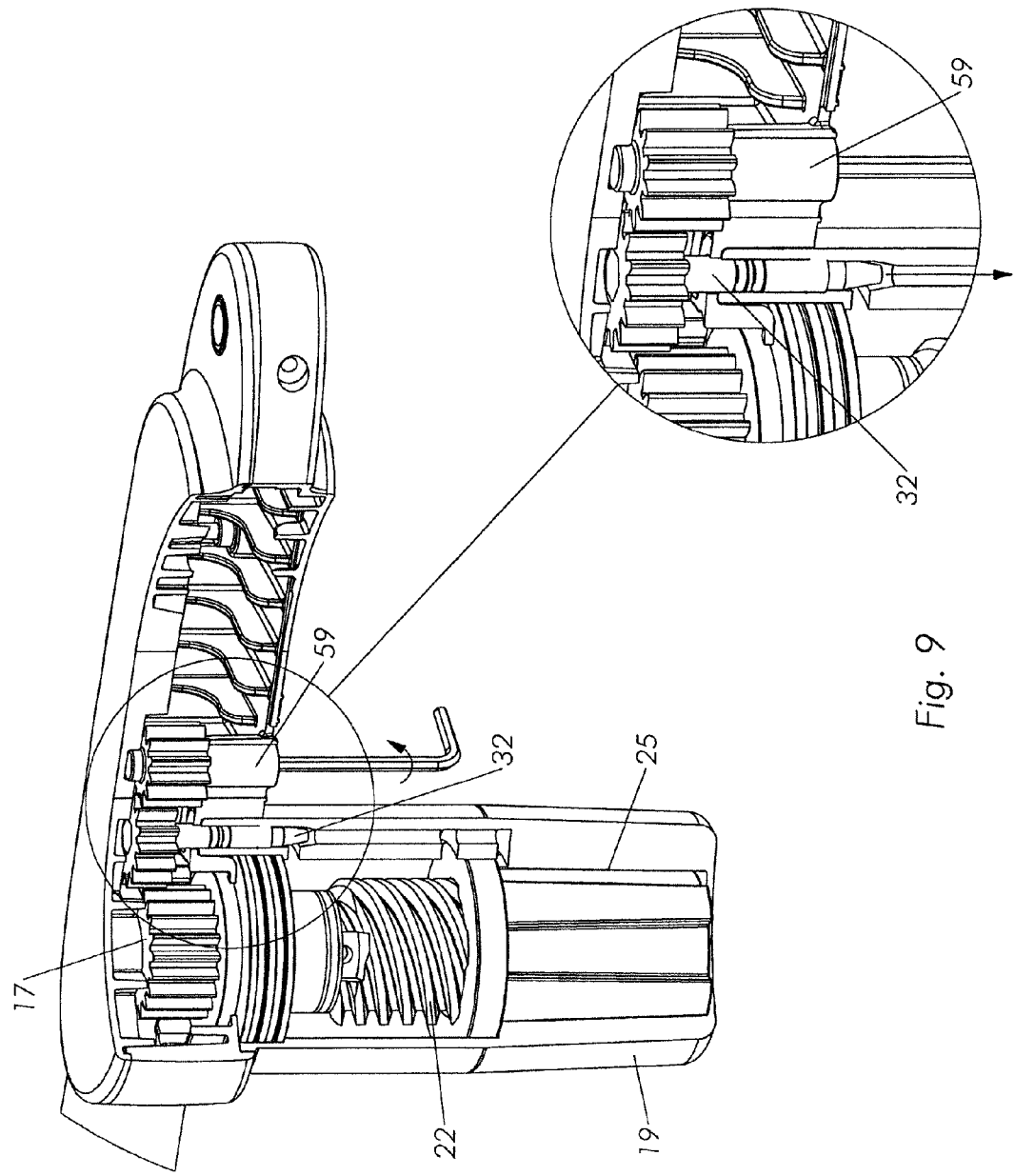

DOOR CLOSING MECHANISM

CROSS REFERENCE TO RELATED APPLICATIONS

This application is a National Stage of International Application No. PCT/EP2009/061087 dated Aug. 27, 2009, which claims priority from European Patent Application Nos. 08169211.3 and 08169208.9, both filed Nov. 14, 2008, the contents of all of which are incorporated herein by reference in their entirety.

BACKGROUND OF THE INVENTION

1. Field of the Invention

The present invention relates to a mechanism for closing a hinged member, in particular a door, a gate, a window, etc., which mechanism comprises a resilient element for effecting closure of the hinged member and a hydraulic damper for damping the closing movement of said hinged member. The damper itself comprises a closed cylinder cavity within a cylinder barrel, a piston placed within said cylinder cavity so as to divide it into a first and a second side, and a damper shaft coupled to said piston.

2. Background

Door or gate closing mechanisms which comprise a combination of a resilient element and a hydraulic damper to effect automatic closure of the hinged closure member without slamming are well-known in the art. The hydraulic components are however delicate and usually badly suited for outdoors use. They are more particularly quite sensitive to temperature variations and are also often subject to leakage problems.

Examples of such door closing mechanisms were disclosed, for example in U.S. Pat. No. 4,825,503 and UK Patent Application GB 2 252 790. These door closing mechanisms comprise a hydraulic rotation damper which includes a rotating piston. These known rotation dampers do however present several drawbacks. Because the rotating piston has a travel of less than 360°, the rotation damper is directly coupled to the actuator output, without any multiplication stages. Since in this application it is important for the damper to be as compact and unobtrusive as possible, the area of the piston is necessarily limited. To achieve the required damping torques, comparatively high hydraulic pressures will thus be required. This makes it more difficult to prevent leaking, in particular through the damping adjustment valve, which is in fluid connection with the high-pressure side of the damper. In particular in outdoor applications, which, to prevent being substantially affected by temperature changes, normally use a hydraulic fluid of low, substantially constant viscosity (i.e. a viscostatic fluid), the low viscosity of the fluid often requires additional measures to prevent leaks. Although only very small amounts of hydraulic fluid may leak out of the damper, it is important to avoid even such small leaks since the damper should be maintenance free for a large number of years.

A further drawback is that it is difficult to achieve a good sealing contact between the rotating piston and the inner wall of the cylinder. In fact, the rotating piston is formed by a rotating vane which has a free edge engaging the inner wall of the cylinder. Manufacturing such a vane and rotatably mounting it into the cylinder so that it fits exactly against the inner side of the cylinder, is a quite complex operation. Consequently, the production of the damper is relatively expensive and since the rotating piston will usually not fit exactly against the inner wall of the cylinder the hydraulic fluid has to be sufficiently viscous to be able to produce the required high pressure. A drawback of such viscous fluids is that their viscosity is usually quite strongly dependent on the temperature so that the known dampers are not appropriate for outdoor applications.

The present invention therefore relates to a closing mechanism the hydraulic rotation damper of which does not comprise a rotating piston but instead a rotating damper shaft, the rotation of which is converted into a translation of the piston. The hydraulic rotation damper comprises more particularly a closed cylinder cavity which has a longitudinal axis and which is defined by a substantially cup-shaped cylinder barrel; a rotational damper shaft which extends through an opening in the cylinder barrel into the cylinder cavity and which is rotatable with respect to said cylinder barrel substantially around said longitudinal axis; a piston placed within said cylinder so as to divide the cylinder cavity into a first side above the piston and a second side below the piston, and said piston comprising: at least one helical thread in engagement with a corresponding thread on either the cylinder barrel or the damper shaft, and a rotation-preventing member in engagement with a guide on the other one of said damper shaft or cylinder barrel, so that a rotational motion of the shaft with respect to the cylinder barrel results in a translational motion of the piston along said longitudinal axis; and a one-way valve allowing fluid flow from said first side to said second side of the cylinder cavity when opening the hinged member.

Such a type of hydraulic damper has already been disclosed in Austrian Patent AT 393 004 B. The piston of this damper is provided with a one-way valve enabling a flow of hydraulic fluid from the first side of the cylinder cavity to the second side thereof when the hinged member is opened. When the hinged member is closed, however, the hydraulic fluid can only flow from the second (high pressure) side to the first side through the clearance between the piston and the wall of the cylinder cavity so that this closing movement is damped. A drawback of such a rotation damper is however that its damping torque is not adjustable.

In the rotation damper disclosed in U.S. Pat. No. 4,094,957, a rotation of the cylinder barrel, caused by the opening or closing of a sliding door, is converted in a translational motion of the piston. In contrast to the damper disclosed in AT 393 004, the damping torque of this rotation damper is adjustable.

An important drawback of this rotation damper is that it is relatively leak-prone. In particular in outdoor applications, which, to prevent being substantially affected by temperature changes, normally use a hydraulic fluid of low, substantially constant viscosity (i.e. a viscostatic fluid), the low viscosity of the fluid requests additional measures to prevent leaks. The fact that the cylinder barrel of this damper of the prior art presents openings at both ends increases the risk of leaks, facilitated both by gravity, and by the higher pressures on the second side of the cylinder cavity. In the first, low pressure side of the cylinder cavity, the damper shaft is more particularly sealed by means of a shaft seal in an opening in a lid closing the top of the cylinder barrel. Due to the fact that the rotation damper is disposed horizontally, the hydraulic fluid can constantly leak by gravity along this shaft seal. In the second, high pressure side of the cylinder cavity the cylinder barrel is provided with an opening for a damping adjustment needle valve. This opening is sealed with a shaft seal around the needle of the needle valve. Hydraulic fluid cannot only leak by gravity along this shaft seal but especially also by the high hydraulic pressure which may be generated in the second side of the cylinder cavity. Although only very small amounts of hydraulic fluid may leak out of the damper, it is important to avoid even such small leaks since the damper should be maintenance free for a large number of years.

It is a first object of the present invention to provide an adjustable hydraulic damper which is nevertheless substantially leak-free.

SUMMARY OF THE INVENTION

To this object, a hydraulic damper according to an embodiment of the present invention may further comprise a fluid passage between said first and second sides of the cylinder cavity, with a flow restrictor, in particular in the form of a needle valve, adjustable through an orifice in the cylinder barrel, wherein said second (high pressure) side of the cylinder cavity and said orifice are at opposite sides of the flow restrictor.

Due to the presence of the one-way valve which allows flow of fluid from the first side of the cylinder cavity to the second side thereof, the damping force of the damper is smaller when the piston is moved towards the first side of the cylinder cavity than when it is moved towards the second side thereof. Consequently, under normal conditions of use, a much higher pressure will be produced in the second cylinder cavity side when the piston is moved towards this second side than in the first cylinder cavity side when the piston is moved towards this first side. As the orifice and the second, high-pressure side of the cylinder cavity are at opposite sides of the flow restrictor, this adjustment orifice will be isolated from the high pressure in the second side of the cylinder cavity, substantially reducing the risk of leaks.

BRIEF DESCRIPTION OF THE DRAWINGS

Several preferred embodiments of the invention will be described illustratively, but not restrictively, with reference to the accompanying figures, in which:

FIGS. 1b and 1c are transversal sections of the rotation damper of FIG. 1a, along, respectively, lines B-B, and C-C;

FIG. 2 is a perspective view of the rotation damper of FIG. 1;

FIGS. 3a-c are further longitudinal sections of the rotation damper of FIG. 1a, with the damper shaft in a clockwise rotation and the piston in an upwards motion;

FIG. 3d is a transversal section of the rotation damper of FIG. 3b along line D-D;

FIGS. 4a-c are longitudinal sections of the rotation damper of FIG. 4a, with the damper shaft in a counter-clockwise rotation and the piston in a downwards motion;

FIG. 5a is a perspective view of an embodiment of a closing mechanism according to the invention comprising a linear actuator;

FIG. 5b is an exploded perspective view of the closing mechanism of FIG. 5a;

FIG. 9 is a detail perspective view of the closing mechanism of FIGS. 5a and 5b;

FIG. 11b is a cut detail view of the closing mechanism of FIG. 11a;

FIGS. 12a and 12b show two alternative arrangements of the closing mechanism of FIG. 11a;

FIG. 13 is an exploded view of the rotational closing mechanism of FIG. 11a.

DETAILED DESCRIPTION OF THE INVENTION

Figure 1A:
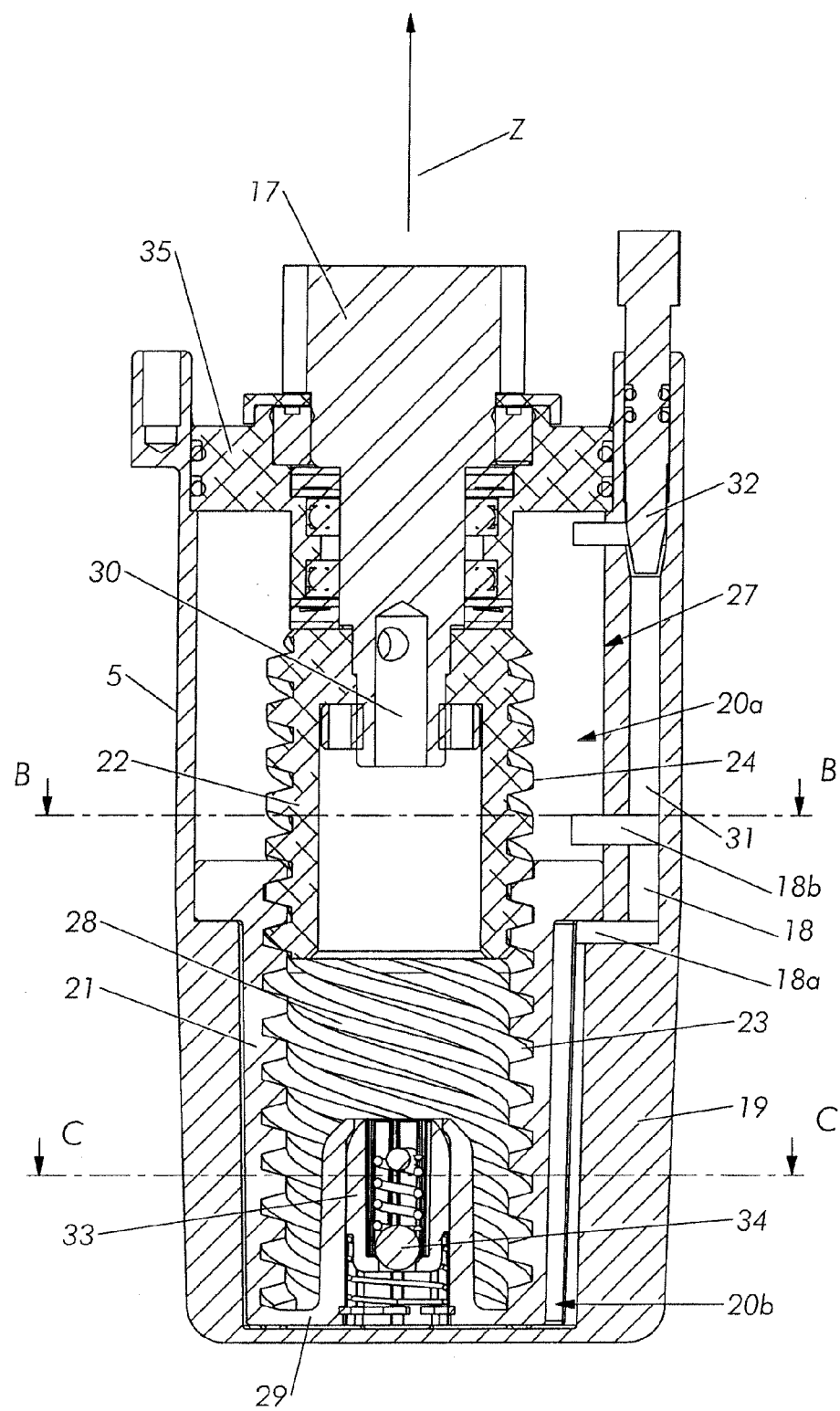
FIG. 1a is a longitudinal section of a rotation damper of a closing mechanism of a particular embodiment according to the invention.

In the closing mechanism of the invention, the top of the cylinder barrel presents an opening through which the damper shaft extends into the first side of the cylinder cavity. Since the opening through which the damper shaft extends into the cylinder cavity leads only to the first, low-pressure side of the cylinder cavity, leaks through this opening, around the damper shaft, are also suppressed. In a vertical orientation of the damper, even gravity leaks are prevented.

Even more advantageously, said orifice for the adjustment of the flow restrictor may also open towards said top of the cylinder barrel, so that, in the abovementioned vertical orientation of the damper, any leaks, in particular also gravity leaks, will be prevented.

Preferably, around the second side of the cylinder cavity, the substantially cup-shaped cylinder barrel is free from sliding joints, and is preferably even completely joint-free.

By "sliding joint" is meant in the present specification a joint between several parts that can move with respect to each other tangentially to a joint surface, translationally and/or rotationally. Sealing such sliding joints presents a problem, since the relative movement of the parts tangentially to the joint can use and/or deform interposed seals, leading to leaks through the joint. Moreover, the seal between the moving parts has to be kept "wet" by the hydraulic fluid this leading always to some loss of fluid.

In the rotation damper of the preferred embodiment of the present invention leakage is prevented due to the fact that any sliding joints, such as the joint between the damper shaft and the opening provided for it at the top of the cylinder barrel, are provided around the first, low pressure side of the cylinder cavity. The presence of the opening at the top of the cup-shaped cylinder barrel in the first side of the cylinder cavity and the absence of sliding joints in the cylinder barrel in the second side of the cylinder cavity have both to be considered in the position of the piston wherein the volume of the first cylinder cavity side is the smallest and the volume of the second cylinder cavity side the largest. The rotation damper is further preferably arranged vertically, with the first side of the cylinder cavity on top, so as to preventing gravity leaks of the hydraulic fluid along the damper shaft.

Advantageously, in a hydraulic rotation damper according to the invention, said piston may present a cavity, open towards the top of the cylinder barrel for receiving said damper shaft, but substantially closed towards the bottom of the cylinder barrel, the damper shaft being screwed in said cavity and said cavity forms part of the first side of the cylinder cavity and is in substantially unrestricted fluid communication with the remaining part of the first side of the cylinder cavity. Since the two sides of the cylinder will thus not be connected by the interface between piston and damper shaft, no pressure loss will occur there. Advantageously, said piston cavity may be in substantially unrestricted fluid communication with said remaining part of the first side of the cylinder cavity through a duct in said damper shaft. Also advantageously, said one-way valve may be placed in said piston, between said second side of the cylinder cavity and said piston cavity. Both these options have the advantage of increased compactness of the rotation damper and of making the construction of the damper less complicated.

In the hydraulic damper of AT 393 004 B, when the one-way valve is closed, hydraulic fluid flows around the piston. The restricted flow around the piston thus dampens the movement of the piston and the rotation of the damper shaft. However, this damping is subject to alteration through either manufacturing tolerances or environmental influences.

It is another object of the present invention to provide a damper with consistent damping characteristics which are not significantly affected by temperature variations.

To this object, in a hydraulic damper according to an embodiment of the present invention, at least at 20° C., an outer perimeter surface of said piston presents a clearance fit with an inner perimeter surface of the cylinder barrel to allow hydraulic fluid contained in the cylinder cavity to flow through said clearance between the piston and the cylinder barrel, with said cylinder barrel being made of at least one first material, having a first thermal expansion coefficient, and said piston of at least one second material, having a second thermal expansion coefficient, said second thermal expansion coefficient being larger than said first thermal expansion coefficient so that said clearance decreases when the temperature of the damper is raised and increases when the temperature of the damper is lowered. The thermal expansion differential between piston and cylinder barrel thus tends to open the clearance between them at lower temperatures, and close it at higher temperatures, automatically compensating for the thermal variation in viscosity of the hydraulic fluid.

Advantageously, said piston may at least be partially in a synthetic material, which allows a precise tailoring of its thermal expansion with respect of that of the cylinder barrel, and simultaneously offers low friction, in particular against a metallic inner perimeter surface of the cylinder barrel.

It is a further object of the present invention to provide a hydraulic damper which is protected against too high stresses in the damper or in the actuator which comprises the damper. For this purpose, the rotation damper of the invention may advantageously be provided with a relief or safety valve allowing fluid flow from said second side to said first side of the cylinder cavity, set to open when an overpressure in said second side exceeds a predetermined threshold, and close again once said overpressure falls back under the same, or a lower threshold. The overpressure required to open the relief valve is higher than the pressure which is required to open the one-way valve to allow fluid flow from the first to the second side since the relief valve should not open under normal conditions of use but only when the pressures would become too high whilst the one-way valve should open immediately when the piston is moved towards the first side of the cylinder cavity so that this movement is damped as little as possible. Just like the one-way valve, the relief or safety valve may also be placed in said piston, between said second side of the cylinder cavity and said piston cavity.

It is a further object of the present invention to release the damping torque near the end of travel of the damper.

To this object, said damper may comprise a substantially unrestricted bypass from a first, lower point of said cylinder cavity to a second, higher point of said cylinder cavity for bypassing said restricted fluid passage. Combined with the angular adjustment of the output arm with respect to the rotational output in the rotational actuator of the first embodiment of the invention, this allows the user to adjust the angular position of the arm at which the damping force will be released.

The terms "top", "bottom", "above", "below", "upwards", and "downwards", as used in this description, should be understood as relating to the normal orientation of these devices in use. Of course, during their production, distribution, and sale, the devices may be held in a different orientation.

Figure 12A:
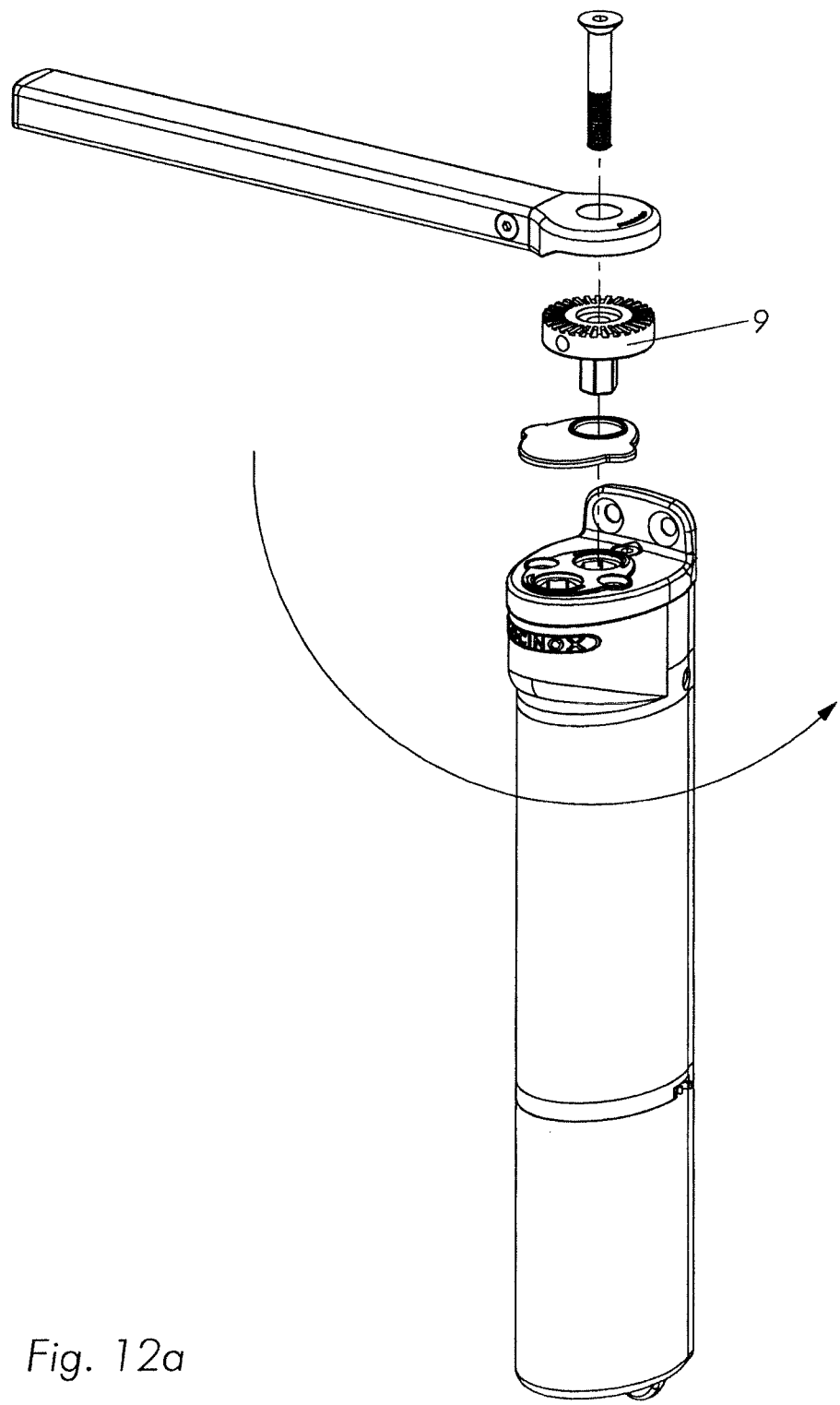
Figure 12B:
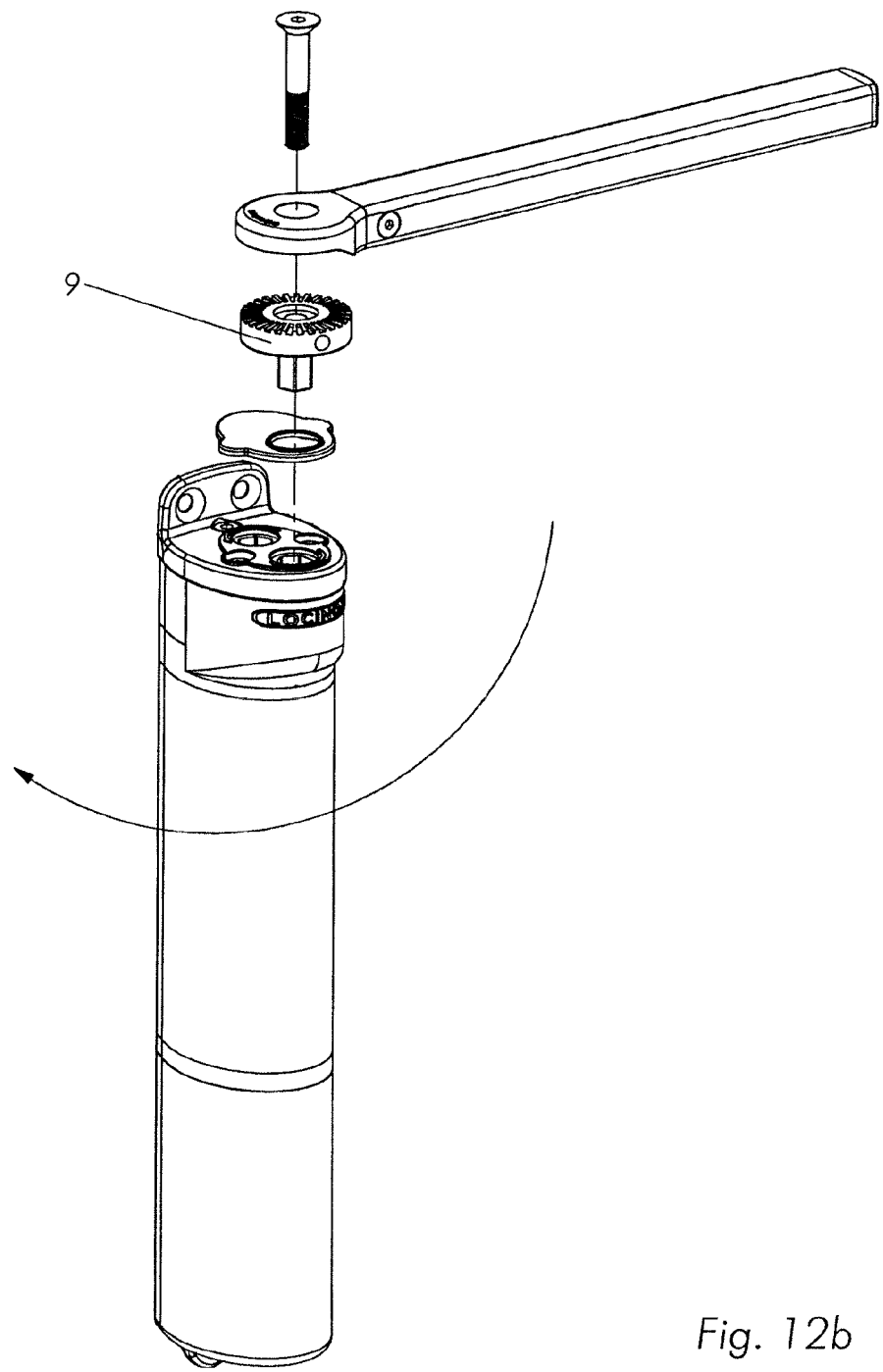
Figure 12C:
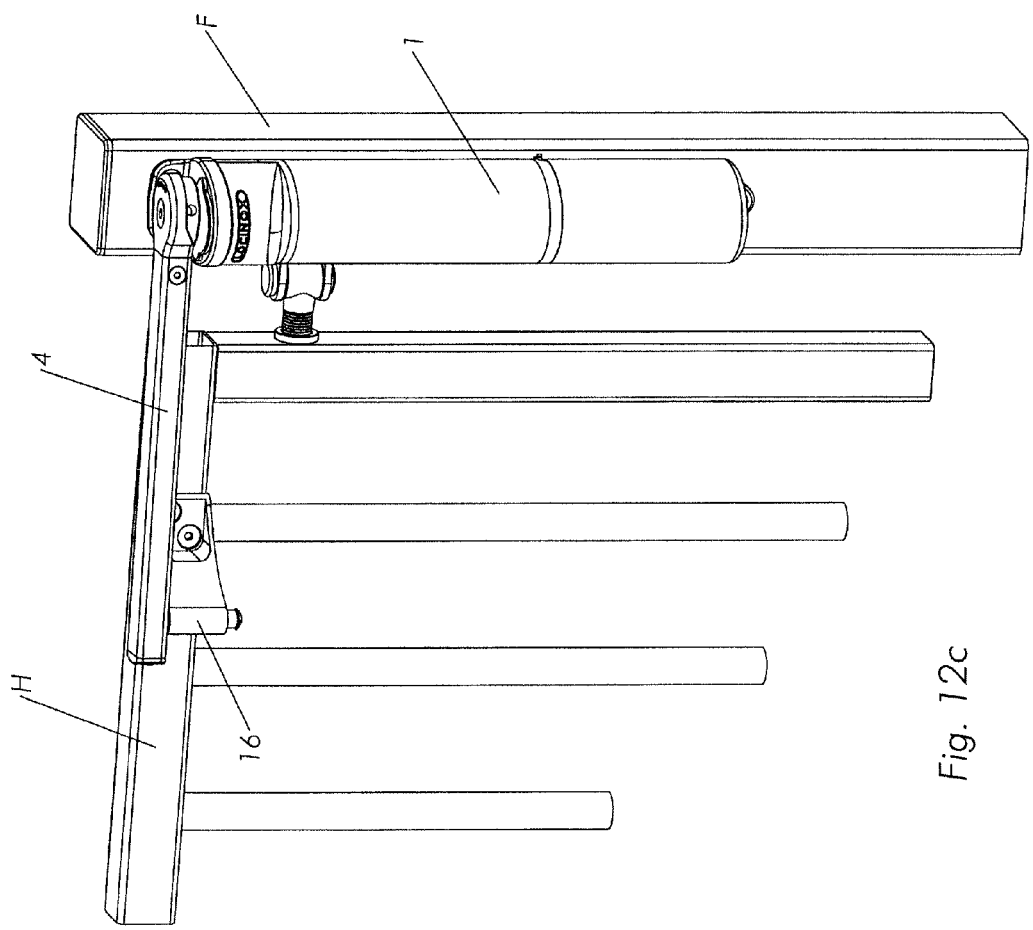
FIGS. 12c and 12d respectively show each one of the abovementioned two alternative arrangements of the rotational closing mechanism of FIG. 11a mounted on a gate.
Figure 12D:
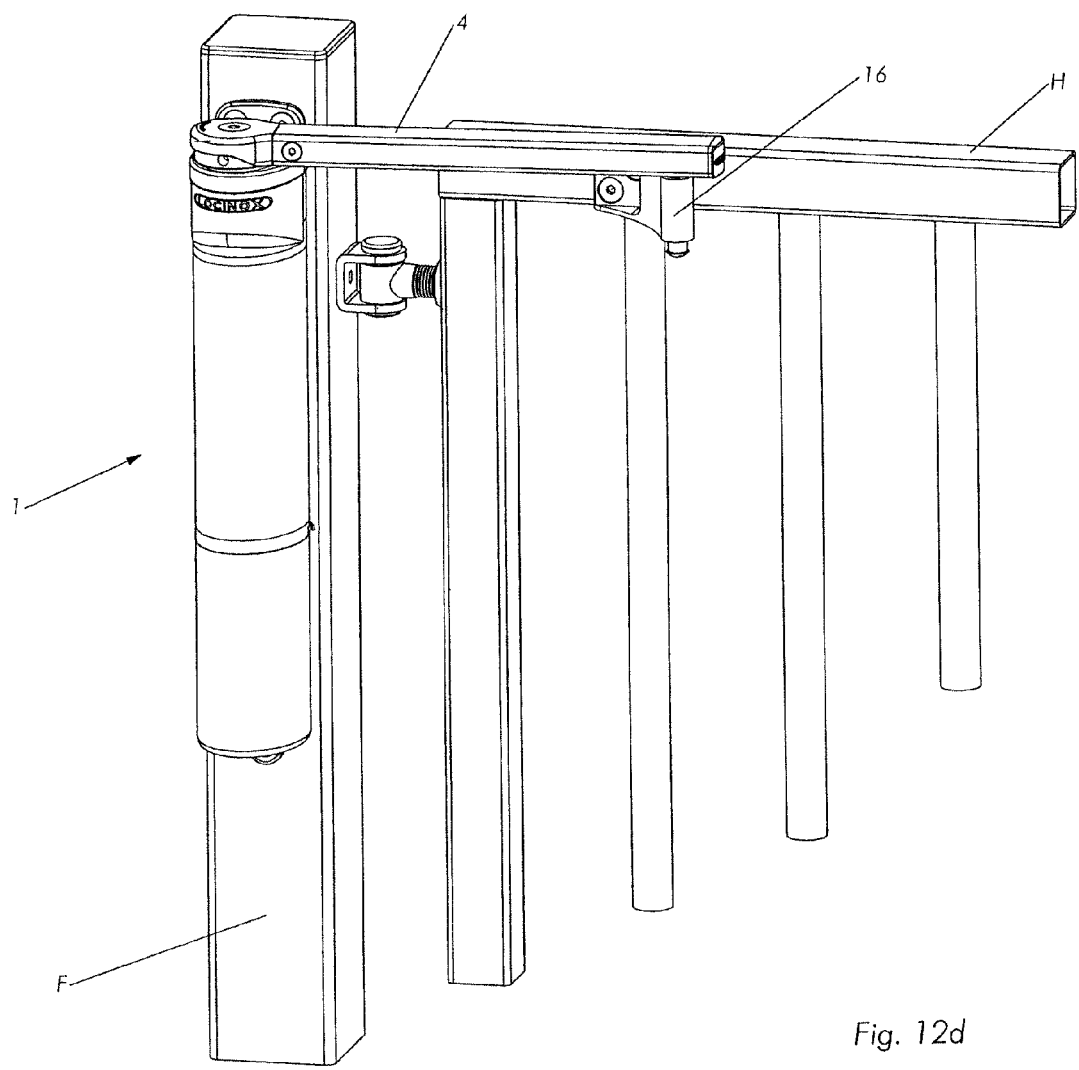
Figure 13:
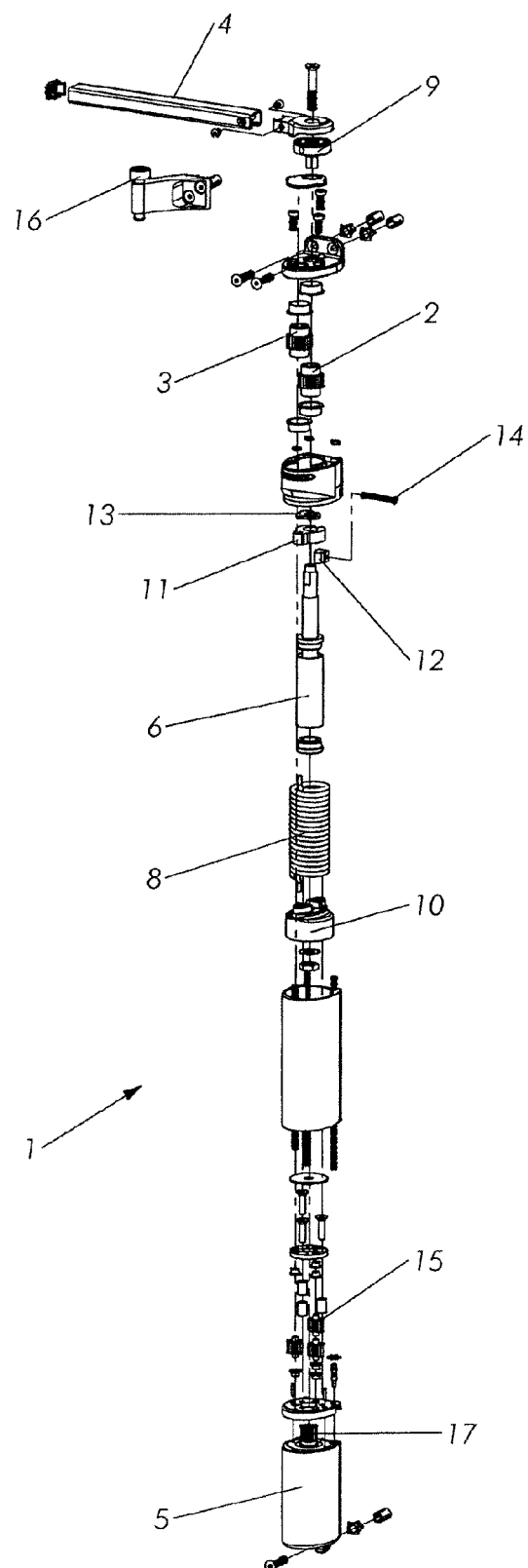

The present invention relates to a mechanism C for closing a hinged member H. The hinged member H may be a door, a gate or a window, in particular an outdoor door or gate which is subjected to strongly varying temperatures. The closing mechanism C comprises a resilient element for effecting closure of the hinged member and a hydraulic damper for damping the closing movement of the hinged member under the action of the resilient element. A first embodiment of the closing mechanism, which comprises a push rod pivotally connected to the hinged member, is illustrated in FIGS. 5 to 8. A second embodiment, which comprises a rotating arm slidably engaging the hinged member, is illustrated in FIGS. 11 to 13. Both closing mechanisms comprise a same hydraulic damper.

A first embodiment of such a hydraulic damper 5, in particular a rotation damper, is illustrated in FIG. 1. It comprises a cup-shaped cylinder barrel 19 which is completely closed at the bottom but open at its top. The open top of the cup-shaped cylinder barrel 19 is closed by means of a lid 35 to form a closed cylinder cavity 20. This cylinder cavity 20 is divided by a piston 21 into a first side 20a and a second side 20b. The damper shaft 22, which in this embodiment is topped by a pinion 17, is connected to the piston 21 and extends through an opening in the lid 35 out of the cylinder cavity 20 forming a sliding cylindrical joint. This sliding cylindrical joint is sealed off by means of a shaft seal (O-ring) applied around the damper shaft 22.

The piston 21 has a piston cavity 28 which has an inner helical thread 23 in engagement with a corresponding outer helical thread 24 on the damper shaft 22. The helical threads are multiple threads comprising in particular four threads. In this way, the step of the threads may be increased, in particular above 10 mm, for example to about 30 mm. The pitch of the threads is however so small with respect to the length of the threaded segment, that more than 1 rotation, preferably more than 1.5 rotation of the damper shaft is required to move the piston from its uppermost to its lowermost position. On its outer side, the piston 21 has a rotation-preventing member in the form of protrusions in engagement with a guide in the form of corresponding longitudinal grooves 25 on part of the inner surface of the cylinder barrel 19. By this means, a rotational movement of the damper shaft 22 is converted into a translational movement of the piston 21 within the cylinder barrel 19. A clockwise rotation of the damper shaft 22 will thus displace the piston 21 upwards, whereas a counter-clockwise rotation of the damper shaft will displace the piston 21 downwards. Alternative means are however at the reach of the skilled person. For instance, the helical threads could be instead on the piston 21 and the cylinder barrel 19, and the rotation-preventing member placed between the piston 21 and the damper shaft 22. Alternative rotation-preventing members, such as, for example, simple pin-and-groove systems, could also be considered according to the particular needs of the user.

The piston 21 further comprises, above said rotation-preventing member, an outer perimeter surface in a clearance fit with an inner perimeter surface 27 of the cylinder barrel 19 at 20° C. This restricts flow of the hydraulic fluid around the piston 21 and a resulting loss of pressure between the first and second sides 20a, 20b. It in particular also enables to use a less viscous hydraulic fluid which offers the advantage that it is easier to select a hydraulic fluid, the viscosity of which is less temperature dependent and thus more suitable for outdoor use. The hydraulic fluid is preferably a substantially viscostatic fluid.

To further reduce the influence of temperature variations in the damping torque of the damper 5, the piston 21 of the illustrated embodiment is in a synthetic material presenting a lower linear thermal expansion coefficient than the material (metal) of the cylinder barrel 19. The clearance between piston 21 and barrel 19 will thus decrease with increasing temperatures, compensating for the decrease in viscosity of the hydraulic fluid. From a certain temperature onwards, for example from a temperature which is higher 25° C., preferably higher than 30° C., but lower than 50° C., preferably lower than 45° C., the thermal expansion differential between piston 21 and barrel 19 may turn the clearance fit into a press fit. The friction between piston 21 and barrel 19 then further compensates for the higher fluidity of the hydraulic fluid.

In a test example of a hydraulic rotation damper 5 according to this embodiment of the invention, the cylinder barrel 19 has an internal diameter of 55 mm at 20° C., whereas the piston 21 has an external diameter of 54.97 mm. The cylinder barrel 19 is made of aluminium, whereas the piston is injection-moulded from a polyoxymethylene (POM) sold under the brand Hostaform® C9021. While the theoretical linear thermal expansion coefficient of aluminium is $2.3 \cdot 10^{-5}$ m/m·K and that of Hostaform® C9021 is $9 \cdot 10^{-5}$ m/m·K, our measurements at $-25°$ C., $20°$ C., and $60°$ C. have resulted in a real average thermal expansion coefficient $\alpha_{real}$ of $3.23 \cdot 10^{-5}$ m/m·K for the inner diameter of the aluminium cylinder barrel 19, and $6.215 \cdot 10^{-5}$ m/m·K for the Hostaform® piston 21. This is explained by the influence of the shapes of these parts, as well as, in the case of the piston 21, by the anisotropic properties of this injection-moulded part. Since during the injection-moulding of the piston 21 the material flows in a significantly longitudinal direction, the piston 21 presents significantly different properties in that direction and in a perpendicular plane.

Table 1 shows the different diameters of the barrel 19 and piston 21 at $-25°$ C., $20°$ C. and $60°$ C., as well as their resulting real average thermal expansion coefficients $\alpha_{real}$. The thermal expansion coefficient is calculated on the basis of the formula:

$$\varnothing_{20+\Delta T} = \varnothing_{20} \times [1+(\alpha \times \Delta T)].$$

TABLE 1

Comparative thermal expansion of cylinder 21 and barrel 19

| | $\varnothing_{-25}$ at $-25°$ C. [mm] | $\varnothing_{20}$ at $20°$ C. [mm] | $\varnothing_{60}$ at $60°$ C. [mm] | $\alpha_{real}$ [$10^{-5}$ m/m · K] |
|---|---|---|---|---|
| Barrel | 54.92 | 55 | 55.07 | 3.23 |
| Piston | 54.82 | 54.97 | 55.11 | 6.215 |

In this test example, the hydraulic fluid used has been a hydraulic fluid sold under the brand Dow Corning® 200(R) 100 cSt. Table 2 presents the clearance cross-section areas (in a plane perpendicular to the longitudinal axis of the cylinder cavity) between barrel 19 and piston 21 at various temperatures. The clearance cross-section areas at 10 and 30° C. have been calculated based on the above mentioned formula and the average thermal expansion coefficients $\alpha_{real}$. They are respectively about 53% larger and about 53% smaller than the clearance cross-section area at 20° C. This percentage can be adjusted by choosing another material, having another thermal expansion coefficient, for the cylinder barrel and/or for the piston, or also by increasing or reducing the clearance between the piston and the cylinder barrel.

TABLE 2

Evolution of clearance area and viscosity with temperature

| | Clearance area [mm²] | Viscosity [cSt] |
|---|---|---|
| $-25°$ C. | 8.619 | 400 |
| 10° C. | 3.971 | |
| 20° C. | 2.591 | 100 |
| 30° C. | 1.210 | |
| 60° C. | $-3.461$ | 50 |

As can be seen from Table 2, at low temperatures the increase of the hydraulic fluid's viscosity is compensated by an almost proportional increase in the area through which the hydraulic fluid may flow around the piston 21. On the other hand, the "negative" clearance at 60° C. indicates that at that temperature the piston 21 is in a press fit with the barrel 19. The present test example transitions from a clearance fit to a press fit at around 37° C. From that temperature onwards, the lower viscosity of the fluid is also compensated by an increasing friction between piston 21 and barrel 19. The elasticity and high resistance against constant stresses shown by synthetic materials, and in particular by the POM used in the example ensures that, even after longer periods in a press fit with the barrel 19, the piston 21 will recover its original shape after cooling.

The cavity 28 of the piston 21 is closed at its lower end to form the piston bottom 29 dividing the cylinder cavity 20 into a first side 20a and a second side 20b. This cavity 28 is connected by a substantially unrestricted fluid duct 30 in the damper shaft 22 to the remaining part of the first side 20a of the cylinder cavity 20 so that pressure in the cavity 28 is substantially the same as the pressure in the remaining part of the first side 20a of the cylinder cavity 20.

The first and second sides 20a, 20b of the cylinder cavity 20 are connected by a fluid passage 31, restricted by a needle valve 32, accessible through an orifice opening at the top of the cylinder barrel 19 for adjusting its resistance to hydraulic fluid flow between the first and second sides 20a, 20b, and therefore the damping characteristics of the rotation damper 5. The needle of the needle valve 32 is sealed by means of a shaft seal (O-ring) in the orifice opening.

The illustrated rotation damper 5 is substantially unidirectional, opposing a substantially higher torque resistance to a counter-clockwise rotation of the damper shaft 22 (lowering of the piston) than to a clockwise rotation of the same damper shaft 22 (raising of the piston) at the same speed. For this purpose, the rotation damper 5 comprises a further fluid duct connecting the first and second sides 20a and 20b of the cylinder cavity 20. This further duct is not provided with a needle valve but instead with a one-way valve 33 allowing hydraulic fluid flow from said first side 20a to said second side 20b of the cylinder cavity 20. Therefore, when the damper shaft 22 rotates in a counter-clockwise direction in respect to the axis Z, and the piston 21 travels downwards, the one-way valve will stay closed, and the rotation damper 5 will oppose a significantly higher torque against this movement than when the damper shaft 22 rotates in a clockwise direction and the piston 21 travels upwards, in which case the one-way valve 33 will open, letting the hydraulic fluid flow from the first side 20a to said second side 20b.

In the illustrated embodiment, the rotation damper 5 comprises, within the body of the one-way valve 33, yet another duct connecting the first and second sides 20a and 20b of the cylinder cavity. This duct comprises a relief valve 34 allowing flow of hydraulic fluid from the second side 20b to the first side 20a only when the pressure inside the second side 20b becomes too high, i.e. when it exceeds a safety threshold level. This valve is thus a safety valve which prevents damage to the mechanism, for example when a person or the wind exerts an extra force onto a door or gate connected to this rotation damper 5 to close it. In this case, opening of the valve allows a higher closing speed (forced closing of the hinged member) and thus prevents high stresses in the rotation actuator and in the arm linking it to the hinged member. In the illustrated embodiment, both the one-way valve 33 and the relief or safety valve 34 are provided in ducts in the piston bottom 29, between the second side 20b and the piston cavity 28. However, alternative configurations and locations of this valve system are within the reach of the skilled person, for instance with separate valves, of which at least one could possibly be located in the cylinder barrel 19, according to the user requirements.

The fluid passage 31 also comprises a bypass 18 between a first, lower point 18a of the cylinder cavity 20, and a second, higher point 18b of the cylinder cavity 20. For most of the travel of the piston 21, both first and second points 18a,18b will be below the piston 21, and thus on the same second, high pressure side 20b of the cylinder cavity 20 as shown in FIGS. 4a and 4b. However, when the piston 21 travels below the second point 18b, the bypass 18 will allow hydraulic fluid to bypass the needle valve 32, as shown in FIG. 4c, releasing the overpressure in the second side 20b and reducing (or even releasing) the overpressure in the second side 20b and reducing the damping torque of the hydraulic rotation damper 5.

Due to the presence of the one-way valve 33, the highest hydraulic fluid pressures will be reached in the second side 20b of the cylinder 20. Because the cylinder barrel 19 is cup-shaped, and completely closed at the bottom, in particular in the second, high pressure side 20b of the cylinder cavity 20, the illustrated hydraulic rotation damper 5 cannot leak, even when it is filled with a relatively low viscous hydraulic fluid which is particularly suited for outdoors applications, such as gate closing mechanisms. With the expression "completely closed in the second side of the cylinder cavity 20" is meant that the cylinder barrel does not have any opening allowing flow of fluid from said high-pressure second side 20b of the cylinder cavity 20 out of the damper. Although not preferred, it is also possible in the damper of the present invention to provide joints in the cylinder barrel 19 in the second side 20b of the cylinder cavity 20, but only in so far as those joints are not sliding joints between parts relatively movable tangentially to a joint surface. In an alternative embodiment, the bottom of the cylinder barrel could thus be a separate part affixed against the substantially cylindrical portion of the cylinder barrel, with a static seal pressed within the non-sliding joint formed between these two components. It is also possible to make a hole in the cylinder barrel for filling the cylinder cavity with the hydraulic fluid, and to close this hole in a completely fluid-tight manner by means of a screw plug.

Turning to FIGS. 3a to 3d, if the damper shaft 22 is rotated by an external torque in a clockwise direction around axis Z, the piston 21 will move upwards. Since the one-way valve 33 is set to open at a pressure at the first side 20a of the cylinder 20 higher than that of the second side 20, hydraulic fluid will flow from the first side 20a, through said piston cavity 28 and one-way valve 33, to the second side 20b, as shown in FIGS. 3b, 3d, and the rotation damper 5 will only oppose a small resistance to this movement. If the damper shaft is rotated in the opposite, counter-clockwise direction around axis Z, as shown in FIGS. 4a-4c, the piston 21 will move downwards. Since the one-way valve 33 will now remain closed, the hydraulic fluid will flow back from the second side 20b to the first side 20a only through the restricted duct 31, and the rotation damper 5 will thus oppose a higher resistance to this return movement.

FIGS. 5a-10b illustrate a closing mechanism comprising a linear actuator 49 with the rotation damper 5 already illustrated in FIG. 1.

Figure 6:
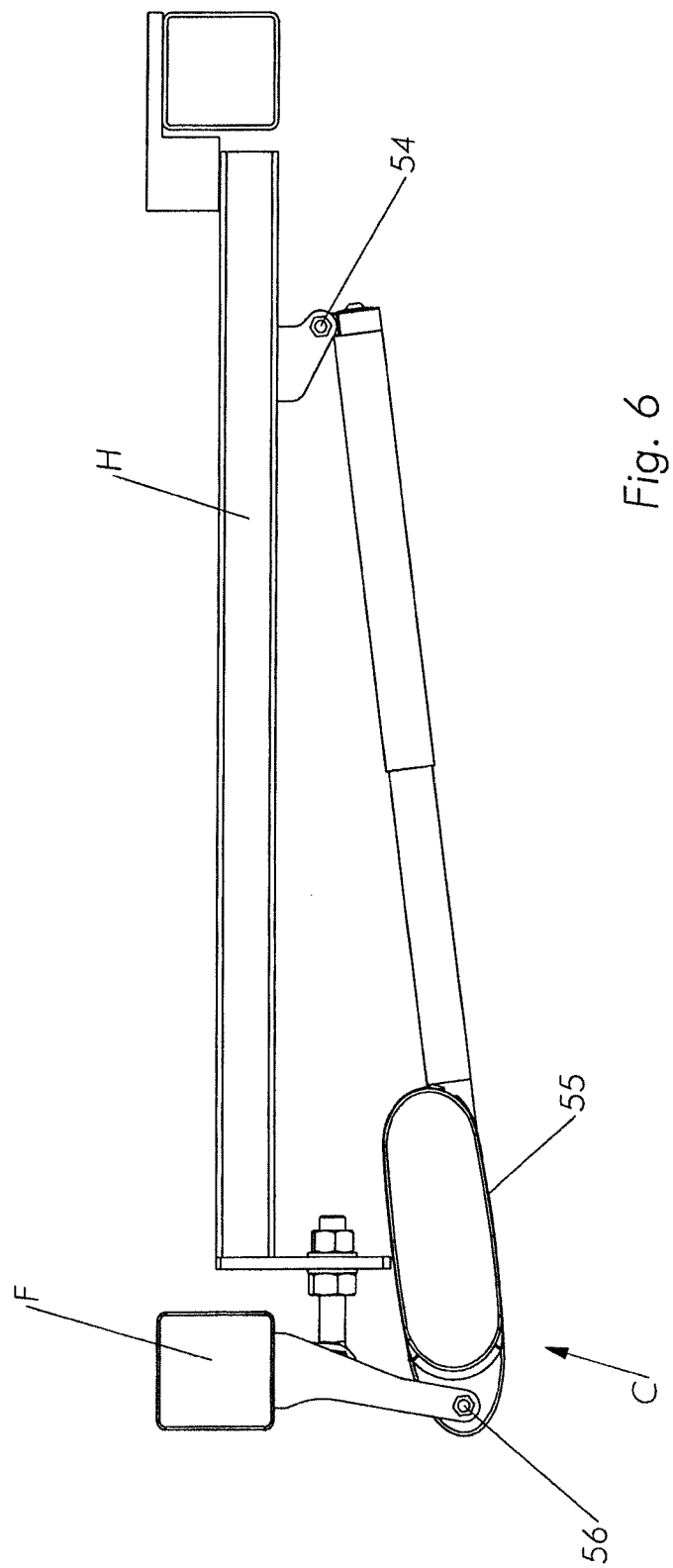
FIGS. 6-7 are top views of the closing mechanism illustrated in FIGS. 5a-5b mounted on a gate.
Figure 7:
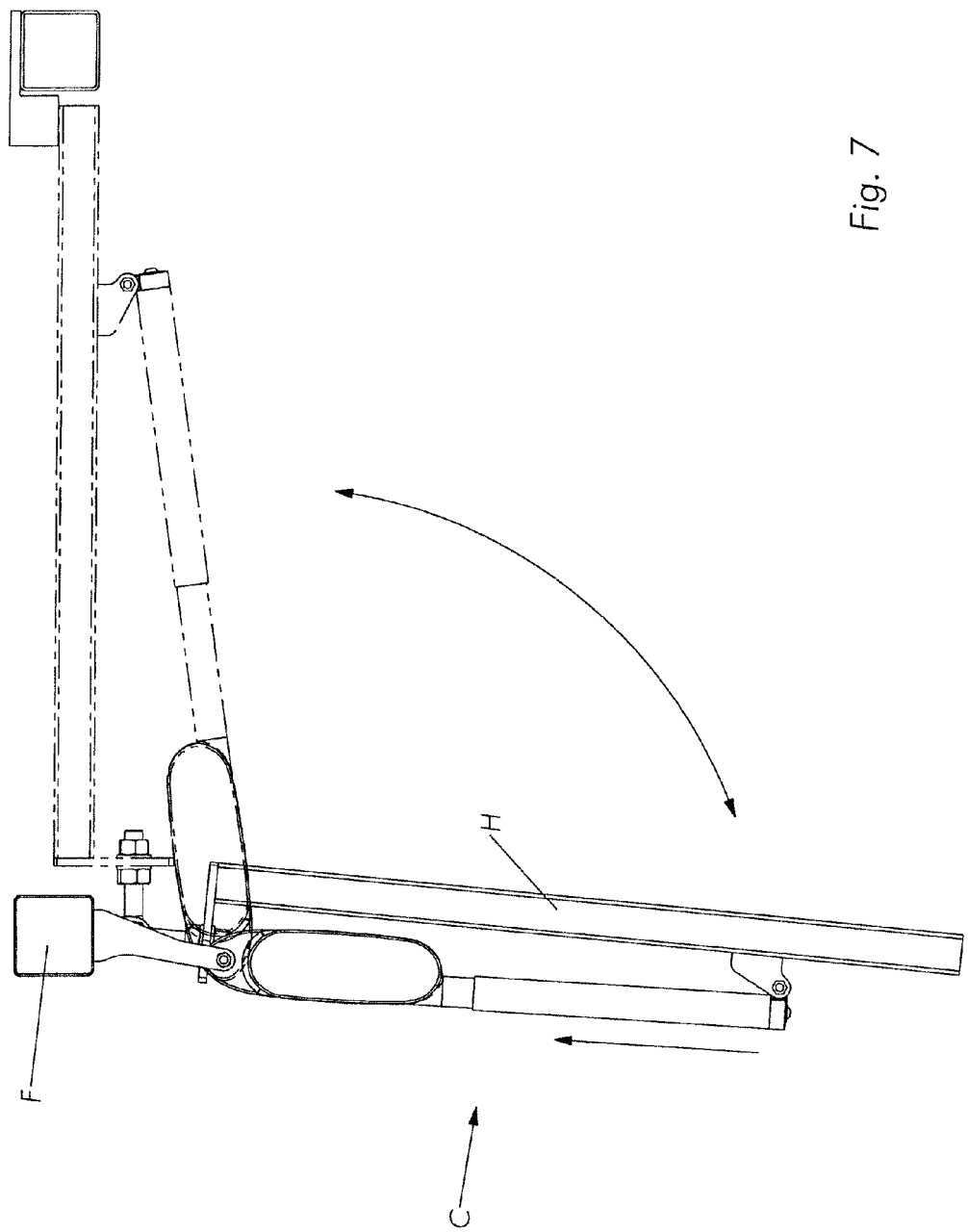
Figure 8:
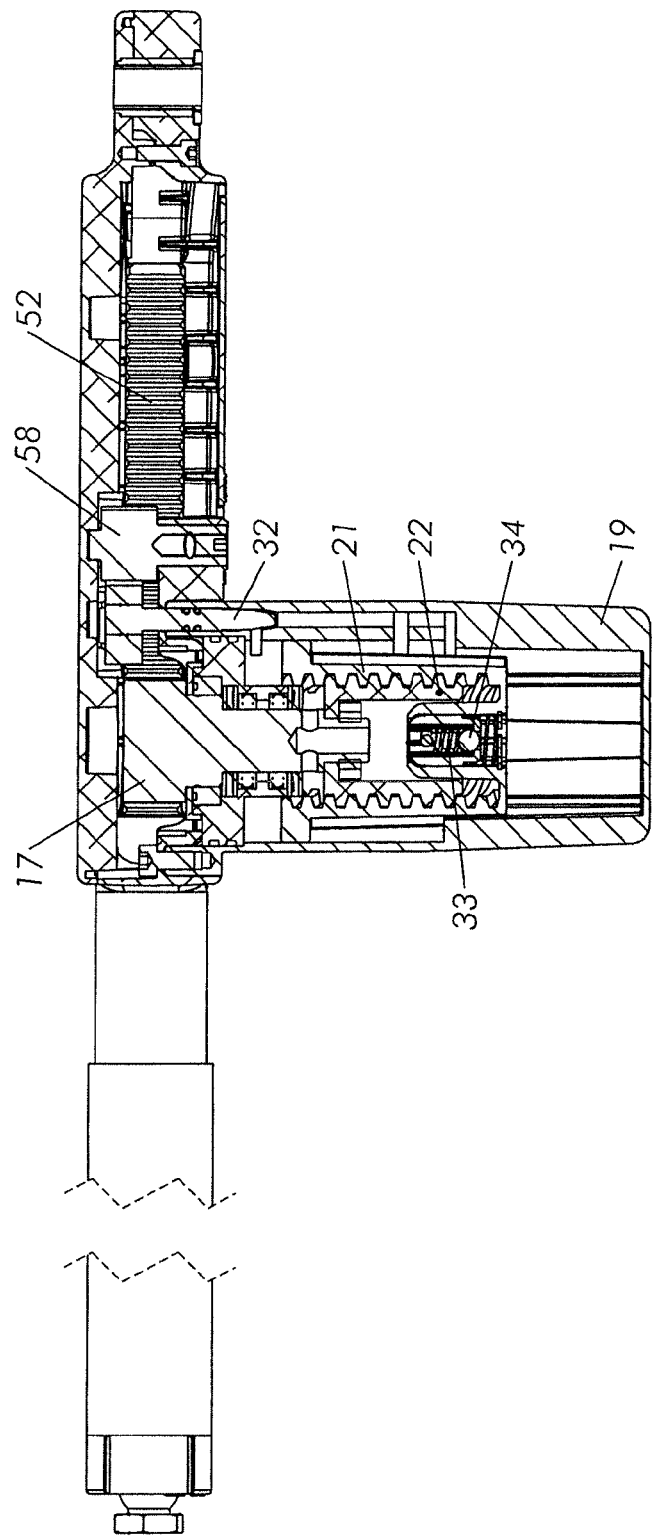
FIG. 8 is a detail cut view of the closing mechanism of FIGS. 5a and 5b.
Figure 10B:
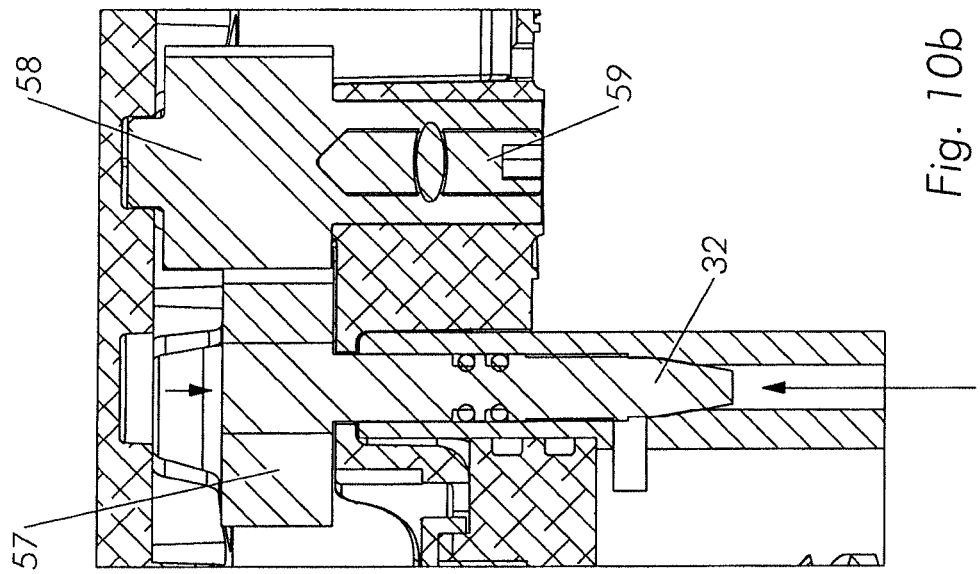
FIGS. 10a, 10b are detail cut views of the closing mechanism of FIGS. 5a and 5b.
Figure 10A:
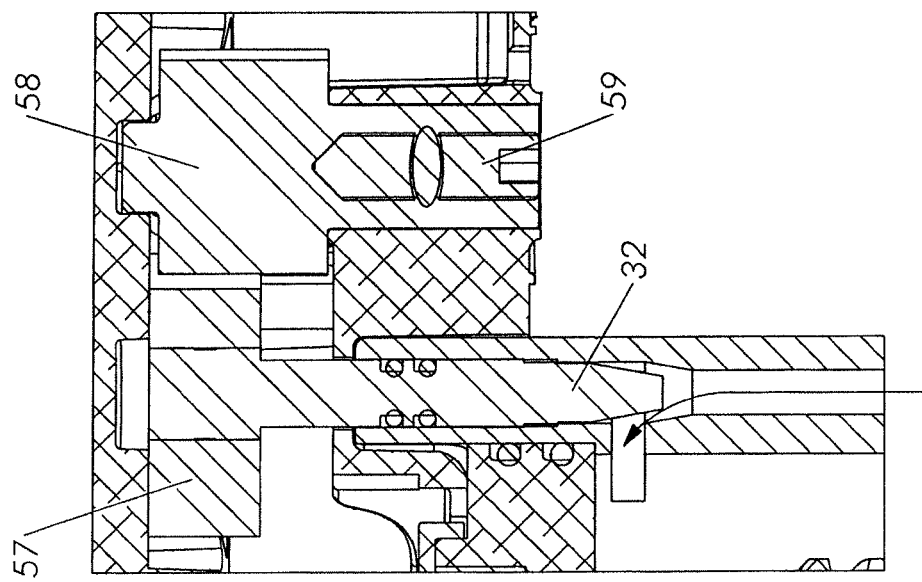

The linear actuator 49 comprises a pushrod 50, a resilient element 51, in this particular embodiment in the form of a pressure coil spring, urging the pushrod 50 in an outwards direction along axis X, rotation damper 5, and a motion-converting mechanism, formed in this particular embodiment by a rack 52 formed on said pushrod 50 and said pinion 17, topping the damper shaft 22 and in engagement with said rack 52. A linear movement of the pushrod 50 in said outwards direction is converted into a counter-clockwise rotation of the damper shaft 22 around the axis Z, and thus in a downwards, highly damped motion of the piston 21. The opposite movement of the pushrod 50 will however be only slightly damped, since the piston 21 will move upwards. This linear actuator 49 can be for instance used in a telescopic closure mechanism C such as is illustrated in FIGS. 6, 7, with a first pivot 54 at the distal end of the pushrod 50, and a housing 55 with an opposite second pivot 56, wherein said first and second pivots 39, 41 can be used to connect the closure mechanism C to, respectively, one or the other of a hinged member H or fixed frame F, as illustrated in FIGS. 6, 7. Such closure mechanisms C can be used for hinged members opening in either direction: opening the hinged member H will always result in a contraction of the closure mechanism C and closing it in an extension.

Since the housing 55 is fixed to the top of cylinder barrel 19, the needle valve 32 is not directly accessible. Instead, as seen in particular in FIGS. 9 and 10a-b, it is coupled to a gearwheel 57 in engagement with a pinion 58 coupled to a small shaft 59 accessible from the bottom of the housing 55 to adjust said needle valve 32.

Table 3 presents closing times at various temperatures of an example of such a linear actuator 49 comprising the above-mentioned test example of the rotation damper 5, with an aluminium barrel 19, a piston 21 injection-moulded from Hostaform® C9021, and Dow Corning® 200(R) 100 Cst hydraulic fluid.

TABLE 3

| Temperature and closing time | | | |
|---|---|---|---|
| Temperature [° C.] | −25 | 20 | 60 |
| Time [s] | 8 | 10 | 11 |

As can be seen in this table, despite the eight-fold decrease in viscosity of this hydraulic fluid over this 85 K temperature range, this example of the linear actuator 49 is actually slightly more strongly damped at high temperatures than at low ones.

Figure 11A:
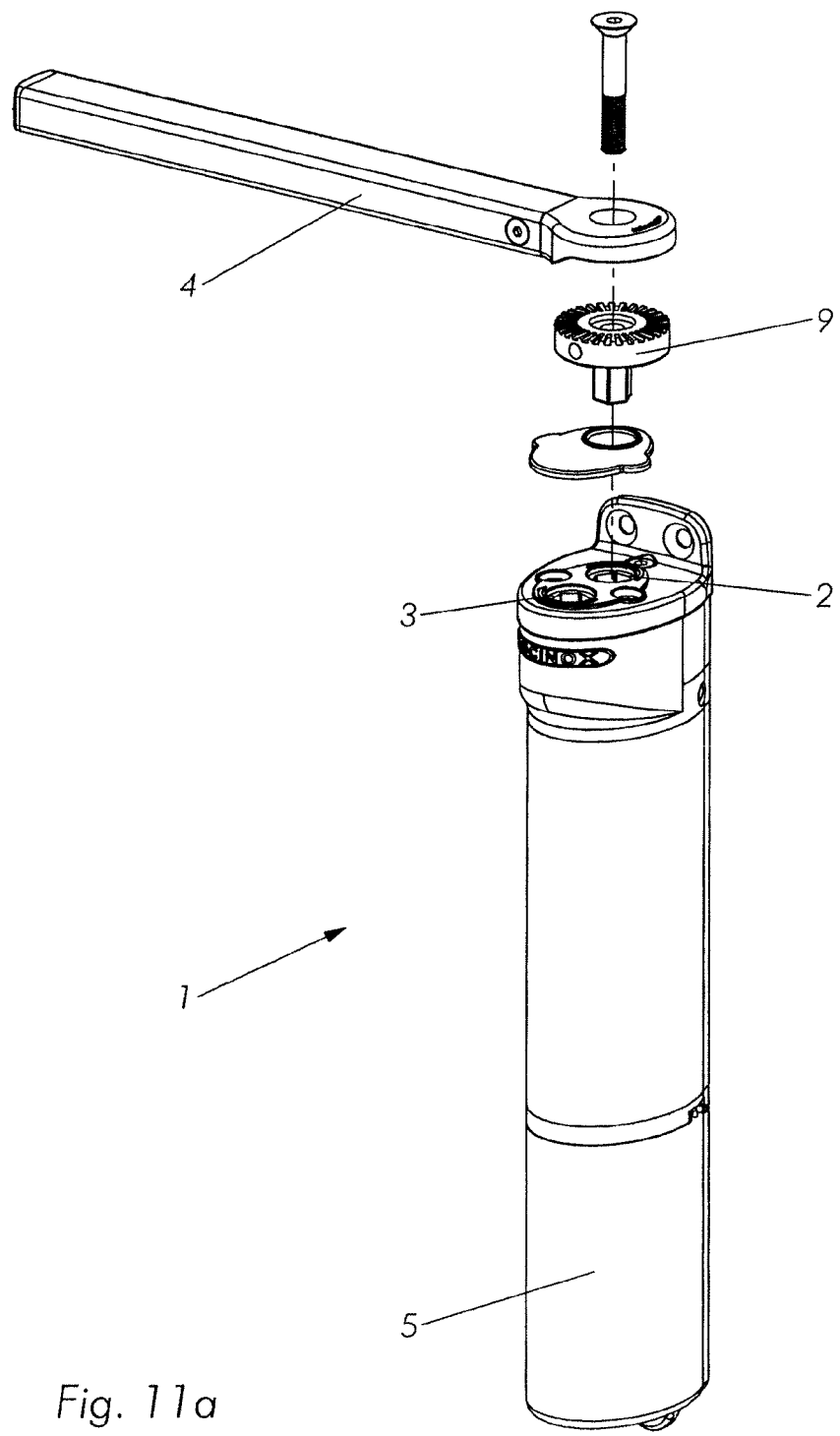
FIG. 11a is a perspective view of an embodiment of a closing mechanism according to the invention comprising a rotational actuator.
Figure 11B:
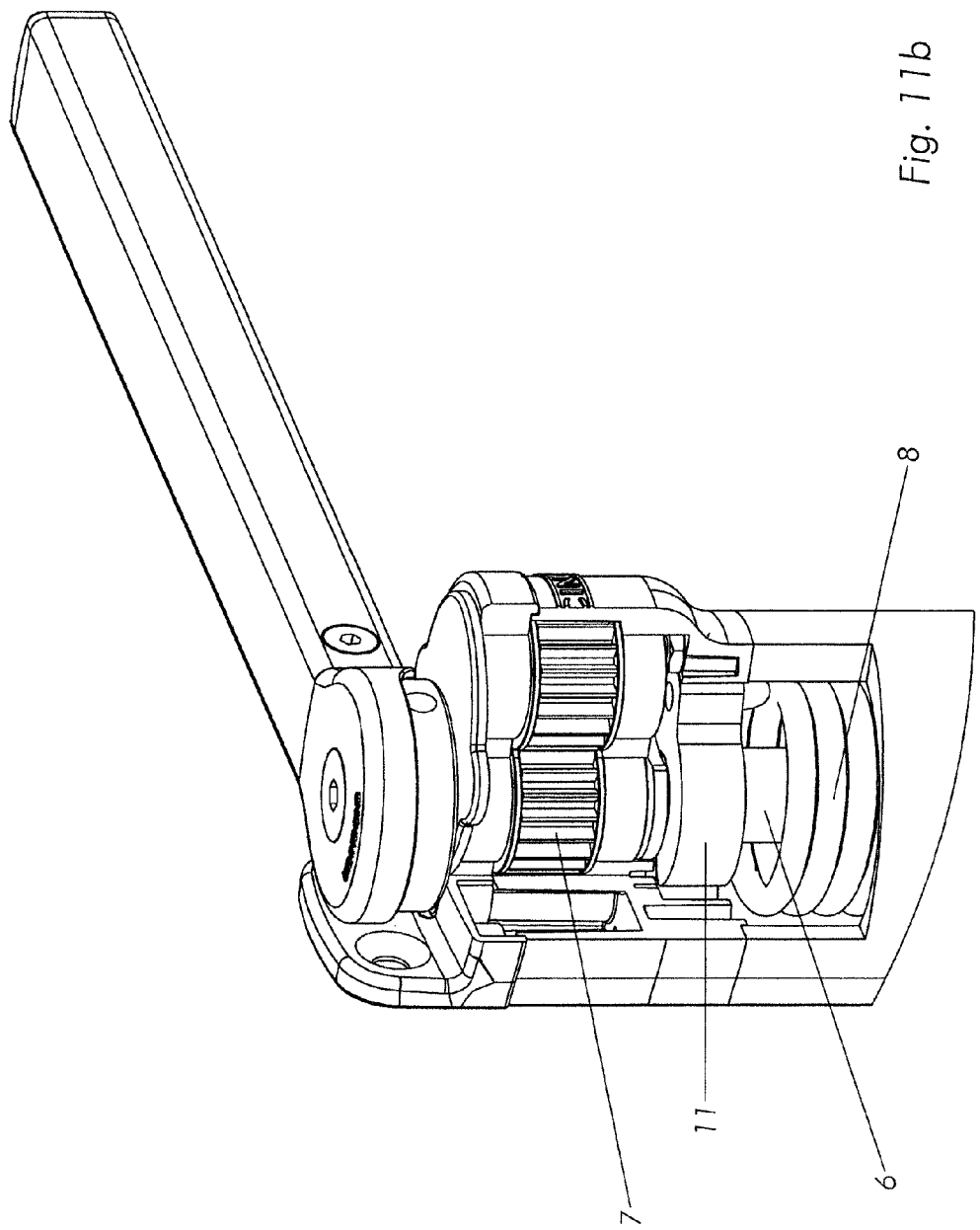

An embodiment of a closing mechanism comprising a rotational actuator 1 according to the invention is illustrated in FIG. 11a. The illustrated actuator 1 has two alternative rotational outputs 2, 3, and an output arm 4 connectable to either one of said first rotational output 2 or second rotational output 3. Turning now to FIG. 11*b*, the first rotational output 2 is directly coupled to an output shaft 6, whereas the second rotational output 3 is coupled to said output shaft 6 over a reversing gearing 7. A torsion spring 8 is coupled to the output shaft 6 so as to urge it in a first, clockwise direction of rotation. In this manner, the output arm 4 will be urged in this first direction if it is coupled to the first output 2, as illustrated in FIG. 12*a*, and in an opposite, counter-clockwise direction if it is coupled to the second output 3 instead, as illustrated in FIG. 12*b*. Intermediate element 9 allows an adjustment of the angular position of the output arm 4 with respect to either output 2 or 3. As the angular position of the output arm 4 with respect to the first or second output 2, 3 is adjustable, a user can adjust at which angular position of the output arm 4 the release of the damping torque through the bypass 15 will take place, or even cancel it altogether. The output arm 4 presents, on its underside, a translational guide (not illustrated) for engaging a roller 16. This rotational actuator 1 can thus be used as a closure mechanism for a closure member, such as a door, gate, or wing, hinged to a fixed frame. The rotational actuator 1 could be mounted on the fixed frame, and the roller 16 fixed to the hinged member. Alternatively, the output arm 4 could present a roller at a distal extremity, and a translational roller guide be mounted on the hinged member. Either way, the rotational actuator 1 could be adapted to right- or left-hand opening members by coupling the output arm 4 to either the first or second outputs 2, 3. In FIGS. 2*c* and 2*d*, the actuator 1 in, respectively, the arrangements of FIGS. 2*a* and 2*b*, is shown forming a closing mechanism interposed between a hinged member H and a fixed frame F. In both cases, a member carrying the roller 16 is fixed to the hinged member H, and the rotational actuator 1 is fixed to the fixed frame F.

Figure 13A:
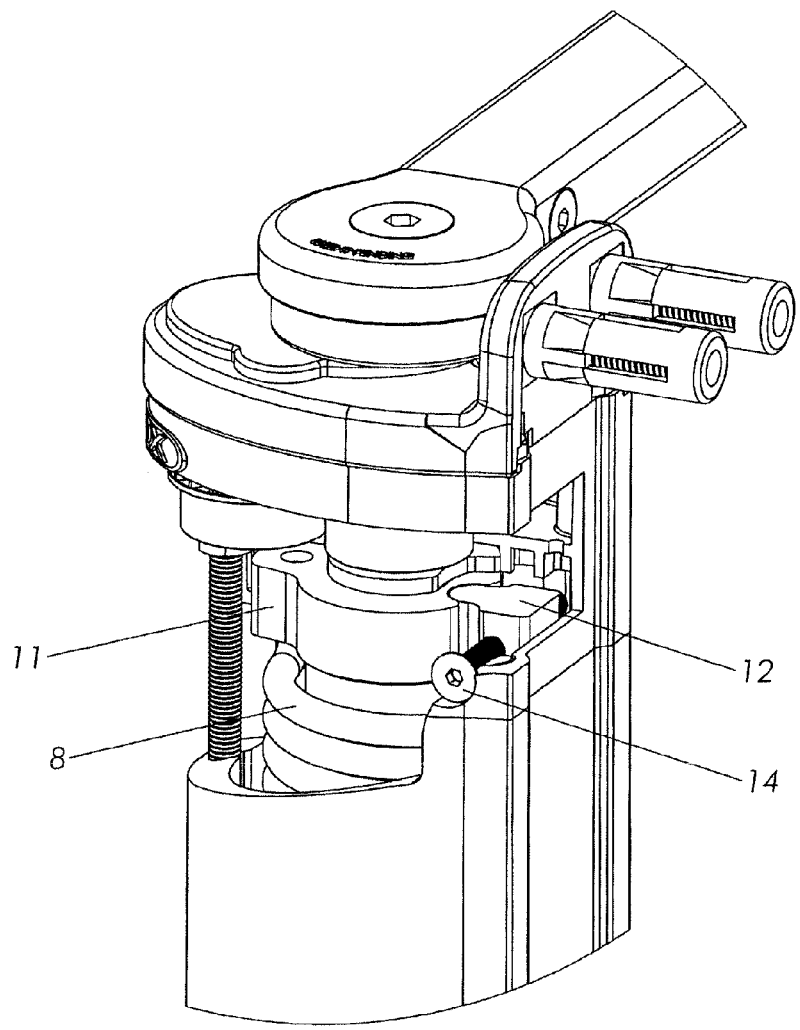
FIGS. 13a-e are detail views showing the mechanism for adjusting the tension of the resilient element of the closing mechanism illustrated in FIG. 13.
Figure 13B:
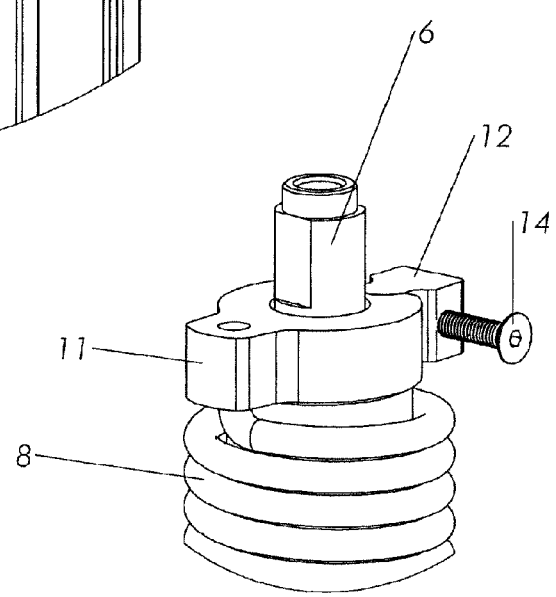
Figure 13C:
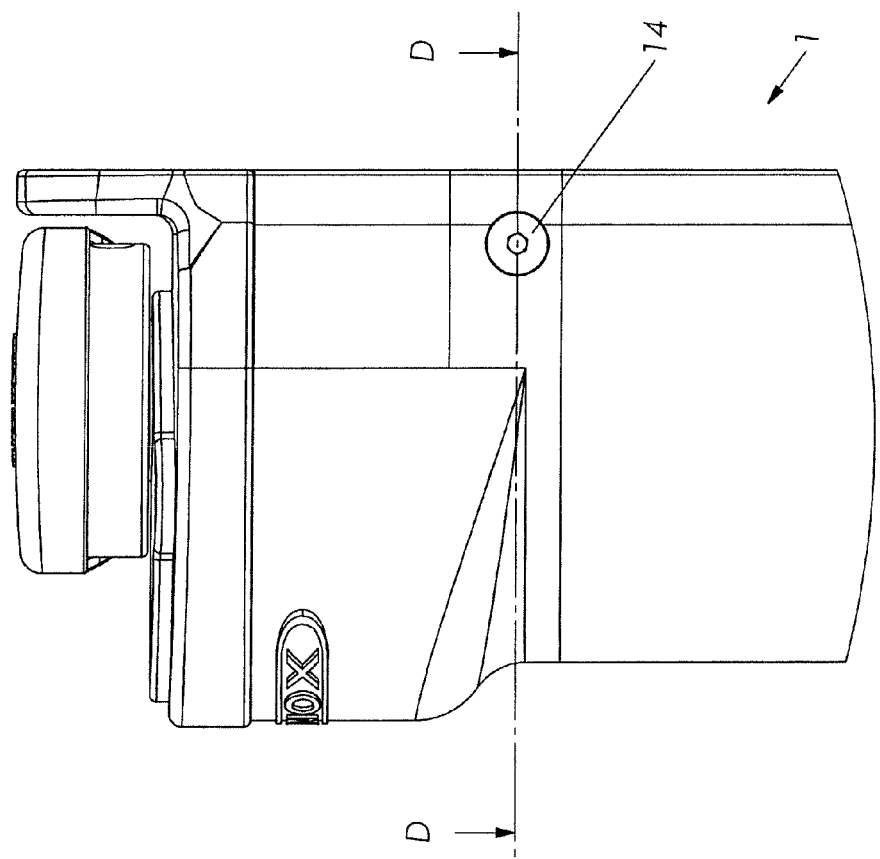
Figures 13D, 13E:
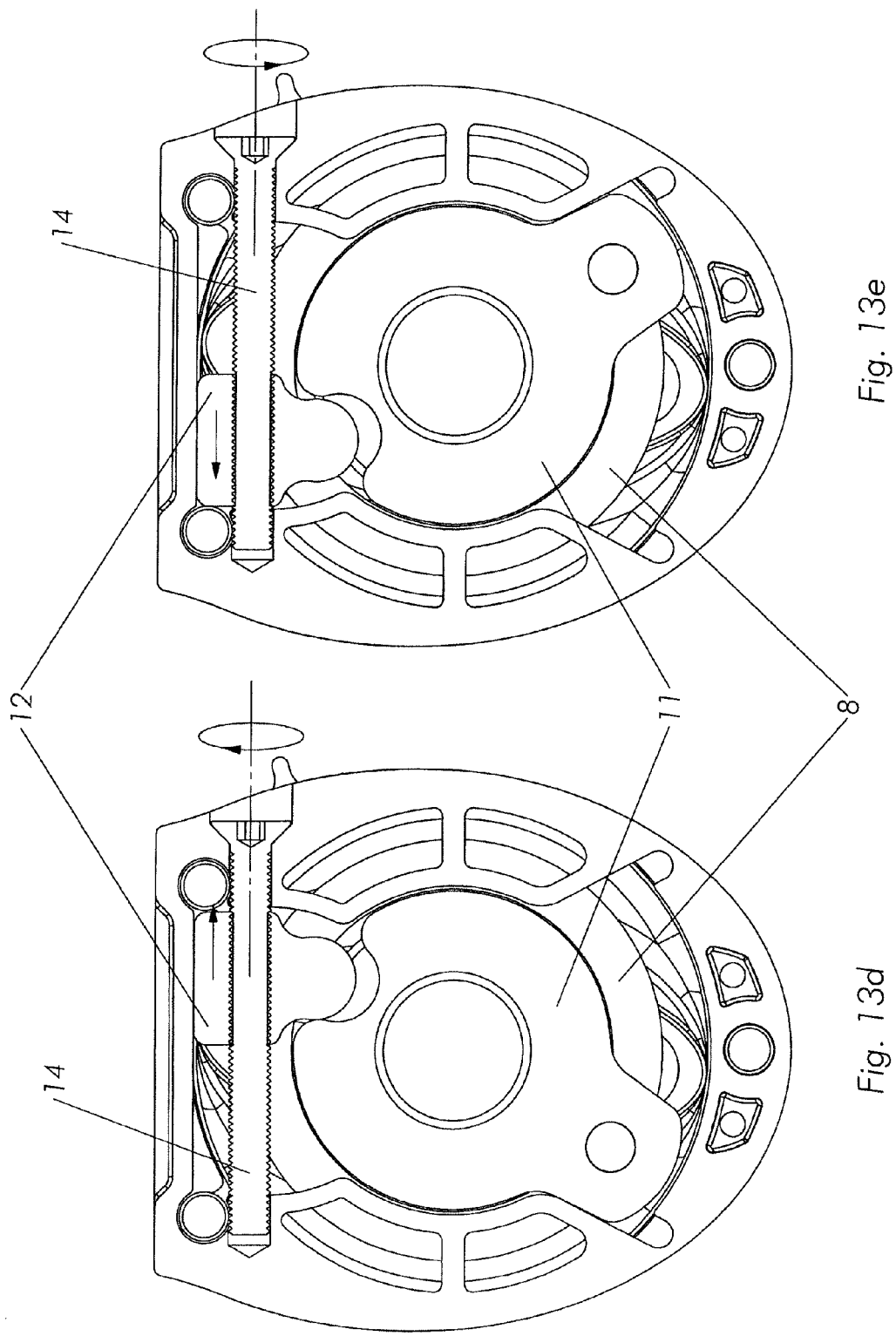

The output shaft 6 is also coupled to a hydraulic rotation damper 5 for damping its rotation in said first, clockwise direction. Turning now to FIG. 13, which shows an exploded view of the rotational actuator 1, the lower end of the output shaft 6 is coupled in rotation to a lower block 10, to which the lower end of the torsion spring 8 is also connected. The upper end of the torsion spring is connected to an upper block 11 in engagement with a finger 12. This is shown in detail in FIGS. 13*a*-13*c*. The upper end of the output shaft 6 is coupled in rotation to a cam plate 13, which rotation in said first direction is limited by a corresponding stop in the housing of the actuator 1. By varying the angular position in said housing of the upper block 11 through adjustment of said finger 12 over a screw 14, it is possible to adjust the preload of the torsion spring 8.

The lower block 10 is in the shape of an inverted cup, forming, on its inside, a ring gear in engagement with planet gears 15, which in turn engage a pinion 17 fixed to the damper shaft 22 of the hydraulic rotation damper 5 and acting as a sun gear. The rotation of the output shaft 6 is thus inversed and transmitted to the damper shaft 22 over a planetary gearing with a multiplication ratio of, for example, at least 1.5, preferably at least 2. In the illustrated actuator, the pinion 17 has 12 teeth, and the ring gear of the lower block 10 has 36 teeth, resulting in a multiplication ratio of 3.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A mechanism (C) for closing a hinged member (H) comprising a resilient element (8 or 51) for effecting closure of the hinged member (H) and a hydraulic rotation damper (5) for damping the closing movement of said hinged member (H), which damper comprises:
   a closed cylinder cavity (20) which has a longitudinal axis and which is defined by a substantially cup-shaped cylinder barrel (19);
   a rotational damper shaft (22) which extends through an opening at a top of the cylinder barrel (19) into the cylinder cavity (20) and which is rotatable with respect to said cylinder barrel (19) substantially around said longitudinal axis;
   a piston (21), placed within said cylinder so as to divide the cylinder cavity (20) into a first side (20*a*) above the piston (21) and a second side (20*b*) below the piston (21), and said piston (21) comprising:
      at least one helical thread (23) in engagement with a corresponding thread (24) on one element selected from the pair consisting of the cylinder barrel (19) and the damper shaft (22), and
      a rotation-preventing member in engagement with a guide (25) on the other one of element selected from said pair consisting of said damper shaft (22) and said cylinder barrel (19), so that a rotational motion of the shaft (22) with respect to the cylinder barrel (19) results in a translational motion of the piston (21) along said longitudinal axis;
   a one-way valve (33) allowing fluid flow from said first side (20*a*) to said second side (20*b*) of the cylinder cavity (20) when opening the hinged member (H);
   characterised in that it further comprises:
   a fluid passage between said first and second sides (20*a*, 20*b*) of the cylinder cavity (20), with a flow restrictor, adjustable through an orifice in the cylinder barrel (19), wherein said second side (20*b*) of the cylinder cavity (20) and said orifice are at opposite sides of the flow restrictor.

2. The mechanism according to claim 1, wherein around said second side (20*b*) of the cylinder cavity (20), the substantially cup-shaped cylinder barrel (19) is free from sliding joints having a sealing function.

3. The mechanism according to claim 1, wherein said orifice for the adjustment of the flow restrictor also opens towards said top of the cylinder barrel (19).

4. The mechanism according to claim 1, wherein, at least at 20° C., an outer perimeter surface of said piston (21) presents a clearance fit with an inner perimeter surface (27) of the cylinder barrel (19) to allow hydraulic fluid contained in the cylinder cavity (20) to flow through said clearance between the piston (21) and the cylinder barrel (19), with said cylinder barrel (19) being made of at least one first material, having a first thermal expansion coefficient, and said piston (21) of at least one second material, having a second thermal expansion coefficient, said second thermal expansion coefficient being larger than said first thermal expansion coefficient so that said clearance decreases when the temperature of the damper is raised and increases when the temperature of the damper is lowered.

5. The mechanism according to claim 1, further comprising a relief valve (34) from said second side (20*b*) to said first side (20*a*) of the cylinder cavity (20), set to open when an overpressure in said second side (20*b*) exceeds a predetermined threshold, and close again once said overpressure falls back under the same threshold.

6. The mechanism according to claim 1, wherein said damper comprises a substantially unrestricted bypass (18) from a first, lower point (18a) of said cylinder cavity (20) to a second, higher point (18b) of said cylinder cavity (20) for bypassing said restricted fluid passage (31), whereby the positions lower and higher are defined based on their distance from the position of the damper at the end of travel in the damped direction, i.e. with the piston having moved towards the second side of the cylinder cavity.

7. The mechanism according to claim 1 comprising:
   a pushrod (50) connected to said resilient element (51) for being urged thereby in one direction along an axis of translation; and
   a motion-converting gearing, comprising a rotary output element (17) directly or indirectly coupled to said damper shaft (22), for converting a motion of said pushrod (50) along said translation axis into a rotary motion of said damper shaft (22).

8. The mechanism according to claim 7, wherein the motion-converting gearing is in the form of a rack- and pinion gearing.

9. The mechanism according to claim 1, comprising a rotational output shaft (6) which is connected to said resilient element (8) for being urged thereby in one direction around an axis of rotation; and which is directly or indirectly coupled to said damper shaft (22).

10. The mechanism according to claim 1, wherein the flow restrictor is in the form of a needle valve.

11. The mechanism according to claim 10, wherein around said second side (20b) of the cylinder cavity (20), the substantially cup-shaped cylinder barrel (19) is joint-free.

12. The mechanism according to claim 11, wherein said piston (21) presents a cavity (28), open towards the top of the cylinder barrel (19) for receiving said damper shaft (22), but substantially closed towards the bottom of the cylinder barrel (19), the damper shaft (22) being screwed in said cavity and said cavity (28) forms part of the first side (20a) of the cylinder cavity (20) and is in substantially unrestricted fluid communication with the remaining part of the first side (20a) of the cylinder cavity.

13. The mechanism according to claim 12, wherein said piston cavity (28) is in substantially unrestricted fluid communication with said remaining part of the first side (20a) of the cylinder cavity through a duct (30) in said damper shaft (22).

14. The mechanism according to claim 12, wherein said one-way valve (33) is placed in said piston (21), between said second side (20b) of the cylinder cavity (20) and said piston cavity (28).

* * * * *